United States Patent
Seymour et al.

(10) Patent No.: US 9,489,131 B2
(45) Date of Patent: Nov. 8, 2016

(54) METHOD OF PRESENTING A WEB PAGE FOR ACCESSIBILITY BROWSING

(75) Inventors: Eric Taylor Seymour, San Jose, CA (US); Patti P. Hoa, San Jose, CA (US); Richard W. Fabrick, II, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1314 days.

(21) Appl. No.: 12/366,588

(22) Filed: Feb. 5, 2009

(65) Prior Publication Data
US 2010/0199215 A1    Aug. 5, 2010

(51) Int. Cl.
G06F 3/0485    (2013.01)
G06F 3/0489    (2013.01)
G06F 3/0481    (2013.01)
G06F 17/30    (2006.01)
G09B 21/00    (2006.01)

(52) U.S. Cl.
CPC ......... *G06F 3/04892* (2013.01); *G06F 3/0481* (2013.01); *G06F 3/0485* (2013.01); *G06F 17/30905* (2013.01); *G09B 21/007* (2013.01)

(58) Field of Classification Search
USPC ........................................ 715/702, 808, 865
See application file for complete search history.

(56) References Cited

U.S. PATENT DOCUMENTS

| | | | |
|---|---|---|---|
| 5,287,102 A * | 2/1994 | McKiel, Jr. | 340/4.14 |
| 7,278,105 B1 * | 10/2007 | Kitts | 715/736 |
| 7,365,738 B2 * | 4/2008 | Molander et al. | 715/865 |
| 8,255,827 B2 * | 8/2012 | Malik | 715/789 |
| 2003/0098803 A1 * | 5/2003 | Gourgey et al. | 341/21 |
| 2005/0268247 A1 * | 12/2005 | Baneth | 715/802 |
| 2006/0184902 A1 * | 8/2006 | Hayes et al. | 715/858 |
| 2009/0292743 A1 * | 11/2009 | Bigus et al. | 707/202 |
| 2010/0070872 A1 * | 3/2010 | Trujillo | 715/745 |
| 2010/0169766 A1 * | 7/2010 | Duarte et al. | 715/702 |
| 2010/0261526 A1 * | 10/2010 | Anderson et al. | 715/701 |

OTHER PUBLICATIONS

"Convenient intelligent cursor control web systems for Internet users with severe motor-impairments" by Tihomir Surdilovic, Yan-Qing Zhang (hereinafter Zhang) International Journal of Medical Informatics vol. 75, Issue 1, Jan. 2006, pp. 86-100 http://www.sciencedirect.com/science/article/pii/S1386505605001504.*

* cited by examiner

*Primary Examiner* — Peiyong Weng

(74) *Attorney, Agent, or Firm* — Schwegman Lundberg & Woessner, P.A.

(57) ABSTRACT

A method of presenting a web page is described which incorporates navigation techniques and tools to allow impaired users to navigate throughout a web page in a convenient and geographically intuitive manner. Elements are sampled for in a region located in a user-specified direction, and a UI tool is presented for a detected element. Elements that are "hit" during sampling may be tested for materiality, and the material element with precedence will become the detected element.

36 Claims, 21 Drawing Sheets

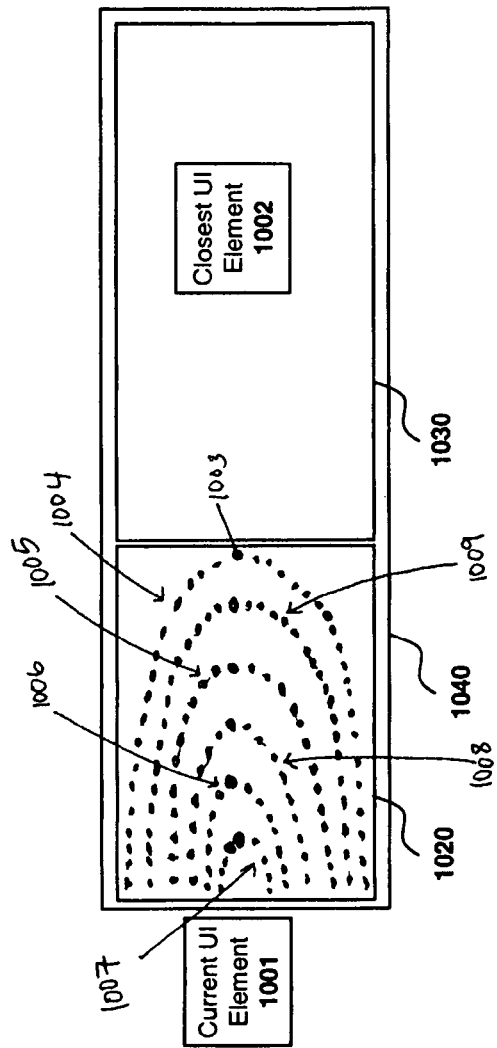
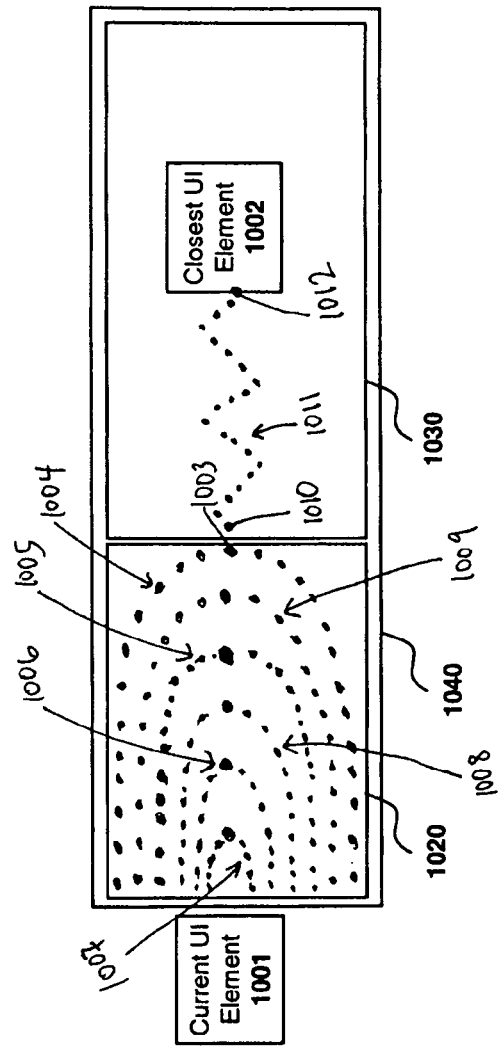
Fig. 10c
Fig. 10d

METHOD OF PRESENTING A WEB PAGE FOR ACCESSIBILITY BROWSING

BACKGROUND

1. Field

Embodiments of the invention relate to computer software, and more particularly, to computer software for assisting visually impaired users to access and interact with computer systems.

2. Background

Most modern operating systems provide a rich graphical user interface (GUI) as the primary means of interacting between a user and the applications and resources of the system. GUIs, while useful to most people, impose a significant challenge to those with disabilities such as blindness, visual impairment, and gross or fine motor challenges.

An individual with a physical or visual impairment or similar disability may install and utilize accessibility software on their personal computer. Accessibility software may provide a set of tools to assist a physically or visually impaired user. The set of tools includes a screen reader that reads the text being displayed on the screen using text-to-speech (TTS) technology, and a navigation tool to allow a user to navigate the operating system GUI using only the keyboard, or in some cases by adapting a pointing device (e.g., mouse) input. In addition to these capabilities, accessibility software for impaired users works with external hardware devices to allow output to be streamed to a refreshable Braille output device which acts like a display.

Existing accessibility software may conflict with other applications or be unable to properly describe these applications unless the applications are specifically designed to be used with a particular accessibility application. As a result, accessibility applications may become non-functional and unable to recover due to programming and run time conflicts with other applications. The non-functional state of the accessibility application hinders the ability of the impaired user to continue to operate an application or navigate the operating system. The impaired user may not have any means of determining the state of the computer system when the accessibility application becomes non-functional. Also, the accessibility application does not run during system start up and a user attempting to utilize the system during start up is not able to access the utilities of the accessibility application.

Spreadsheet, word processing, and text editor applications provide GUI's which are easily navigable due to their structured format for element placement. For instance, in spreadsheet applications, elements (e.g., characters) are placed in a fixed group of cells, which provide for easy and predictable navigation from cell to cell. Likewise, in word processing applications, elements are places within specific and fixed columns and rows, whose widths are dependent upon a selected line spacing and font size. However, web pages are not fixed within any set structure. Elements are not bound to cells or fixed row and column sizes. Further, elements may vary based on size, shape, format (e.g., image, video, characters). Elements on a web page may also serve various purposes—e.g., hyperlink, advertisement, images to be used as dividers, or even an image used for aesthetic design of the web page template.

Existing accessibility applications attempt to provide full keyboard navigation (FKN). This means that while an operating system GUI might be designed primarily for mouse manipulation, it can also be driven from the keyboard by using keyboard commands to move around a screen or to select functions of applications that are currently in the focus or displayed by the operating system. However, existing accessibility applications are not able to allow a user to access all options or features of a GUI. Also, the navigation systems on accessibility applications for impaired individuals may have key mappings that conflict with the key mappings of other applications. This causes either a loss of functionality in the accessibility application stranding the user relying on the navigation system and utilities provided by the accessibility application.

Navigation systems that build maps of web pages are also limited in their effectiveness. Building a map of the web page may, for instance, entail obtaining the coordinates of every element to be mapped and creating a list of those elements in order to utilize their spatial orientations. While this may be effective for very simple web pages with a small number of elements, it is not effective for web pages that contain a large number of elements, which are very common. Building a map of these more complicated web pages—for example, Google News which may contain hundreds of elements—takes a very long time and becomes impractical in its use.

Currently, the known ways to navigate a web page using accessibility tools provide their own set of navigational problems. One such problem is that a very limited geographical orientation of the web page is provided for the user. For instance, "tag-based navigation" allows a user to type a keyword and locate the keyword on the web page, but does not provide the user with any geographical sense of how the web page is structured. It also presents problems when dealing with non-textual elements.

Another known way to navigate a web page uses a coordinate system, where a user may determine what element is located at a specific coordinate on the web page. This proves to be very cumbersome and non-user friendly because an impaired user will have a difficult time guessing which element he is trying to navigate to. If, for instance, the user wishes to move to the right of a web page, not only will the user have to identify that coordinate, which may pose its own problems, but he may also be identifying a trivial or needless element on the webpage, which may end up confusing the user as to what is located to the right on the web page.

"Group navigation" is another way of navigating which provides its own set of problems. Group navigation uses parent/child relationships to group elements together on a web page. Child elements are grouped around a parent element in an intuitive manner. For example, the home page for Google News may have groups for each of the following parent elements: US News, World News, Business News, Science/Technology News, Health News, etc. For each of these parent elements, a list of child elements may exist—e.g., the list of corresponding news article hyperlinks. Furthermore, each of those child elements may have their own group of child elements (i.e., grandchildren to the original parent). The child/parent relationship could continue to further degrees of children.

Group navigation allows a user to move an accessibility tool, e.g. accessibility cursor, from a parent element through its corresponding child elements, and if desiring so, continuing on to a next parent element and then through its corresponding child elements. This too, however, has its limitations. For example, if US News (parent element) and its 5 article hyperlinks (child elements) are located directly to the left of World News (parent element) and its 5 article hyperlinks (child elements), then in order to go from article 3 of the US News to article 3 of the World News, a user would have to cycle through the remaining articles of the US News (i.e., article 4 and 5) and then through the parent element (World News) and its first two articles (article 1 and 2) before arriving at article 3 of World News. Furthermore, groups may not be oriented in even rows or columns and may be further unaligned with images, borders, etc., in between groups, thus making geographical orientation even less intuitive. Furthermore, additional confusion is presented when layers of groups are present (e.g., grandchildren, great-grandchildren, etc.) or when certain formatting structures are present (e.g., bulletpoints).

The Document Object Model (DOM) is another way to navigate through a web page. Web browsers read HTML, XML, and related formats and produce a DOM based on the information sent from the web page. The visual grid layout of the web page is thus turned into a long sequence of elements for the DOM. Thus, when a user navigates from one element to another, he must navigate through the sequence of elements of the DOM. While, the sequence may follow a primitive pattern through the web page, the elements within the sequence may randomly jump around the page. These characteristics make it inconvenient to navigate from one element to another and also take away from the intuitiveness of the geographical orientation of the web page.

Another navigational method uses the design layout of the web page. This depends on the way the web designer layed out the web page. For instance, if a web page was highlighted using a mouse cursor from the top-left corner to the bottom-right corner, each element on the web page would be highlighted in a specific order depending on how the web designer layed out the web page (i.e., how elements were grouped and structured). Thus, a user could navigate through elements in the described order and work his way through the elements in the web page to get to a desired element. However, moving from one element to another adjacent element may not be possible without the user being taken to another undesired group of elements or to an undesired element in another direction (depending on how the web designer layed out the web page). Therefore, navigation of the web page using this technique poses similar problems in navigating among adjacent elements, as well as problems in providing the user with an idea of the geographical orientation of the webpage (since different web pages will be layed out inconsistently and in different ways).

What is needed is a method of presenting a webpage which incorporates navigation techniques and tools to allow impaired users to navigate throughout a web page in a convenient and geographically intuitive manner.

Also, what is needed is a method of presenting a webpage which incorporates the easy navigation used with text editors to navigation used with HTML.

SUMMARY

In one embodiment, a method of presenting a web page is disclosed. A command is received to move in a specified direction on the web page. Whether an element of the web page is present in a region of the web page specified by the move in the specified direction is automatically determined, including sampling for elements of the web page. A user interface (UI) tool is presented for a detected element.

In another embodiment, a machine readable medium having instructions stored therein is disclosed. The instructions which when executed cause a machine to perform a set of operations for presenting a web page. The set of operations are comprised of the following. A command is received to move in a specified direction on the web page. Whether an element of the web page is present in a region of the web page specified by the move in the specified direction is automatically determined, including sampling for elements of the web page. A UI tool is presented for a detected element.

In yet another embodiment, a method of presenting a web page is disclosed. A user interface to allow a user to navigate a web page is generated. An accessibility service is executed to provide an accessibility presentation of user interface elements for the web page. A command is received to move in a specified direction on the web page. Whether an element of the web page is present in a region of the web page specified by the move in the specified direction is automatically determined, including sampling for elements of the web page. A UI tool is presented for a detected element.

In yet another embodiment, a machine readable medium having instructions stored therein is disclosed. The instructions which when executed cause a machine to perform a set of operations for presenting a web page. The set of operations are comprised of the following. An accessibility service is executed to provide an accessibility presentation of user interface elements for the web page. A command is received to move in a specified direction on the web page. Whether an element of the web page is present in a region of the web page specified by the move in the specified direction is automatically determined, including sampling for elements of the web page. A UI tool is presented for a detected element.

BRIEF DESCRIPTION OF THE DRAWINGS

The invention is illustrated by way of example and not by way of limitation in the figures of the accompanying drawings in which like references indicate similar elements. It should be noted that different references to "an" or "one" embodiment of this disclosure are not necessarily to the same embodiment, and such references mean at least one.

FIG. 10a-d illustrate pattern-sampling in a near portion and distant portion of a region, according to one embodiment of the invention.

DETAILED DESCRIPTION

In the following description, specific details are set forth. However, it is understood that embodiments of the invention may be practiced without these specific details. In other instances, well-known circuits, structures and techniques have not been shown in detail to avoid obscuring the understanding of this description.

Figure 1:
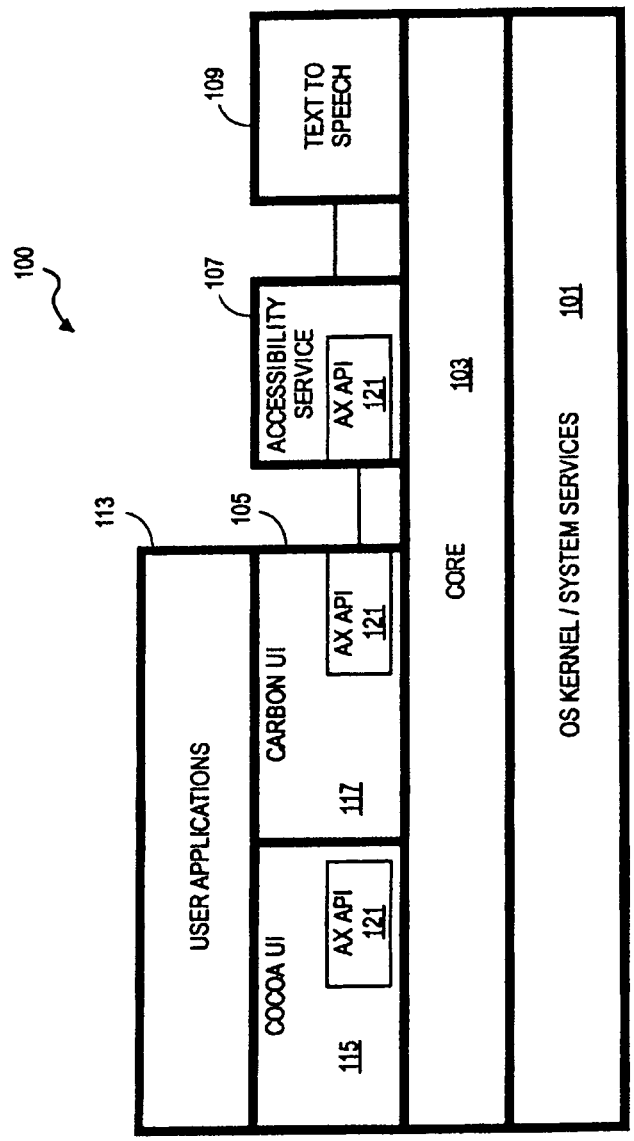
FIG. 1 is a diagram of one embodiment of the software architecture of a computer system including an accessibility service.

FIG. 1 is a diagram of one embodiment of the software architecture for a computer system. In one embodiment, the software architecture 100 may be executed by a general computer system such as a home desktop system, office workstation or similar computer system. In one embodiment, the software architecture 100 may include multiple architectural 'layers' including a core operating system and system services layer or 'kernel' layer 101, a core layer 103, user interface layer 105, user application layer 113 or similar architectural layers or components. In one embodiment, an accessibility service 107 and text-to-speech program 109 may be at the same layer or level as the user interface layer 105.

In one embodiment, the kernel layer 101 may be responsible for general management of system resources and processing time. The kernel 101 may schedule programs for execution, manage memory, service interrupts and perform similar core system tasks. In one embodiment, the core layer 103 may provide a set of interfaces, programs and services for use by the kernel 101, user interface layer 105 including accessibility service 107 and text-to-speech program 109 and user applications 113.

In one embodiment, the user interface layer 105 may include application program interfaces (APIs), services and programs to support user applications 113 and the operating system user interface. In one embodiment, the operating system may be the OS X operating system by Apple, Inc. The user interface layer 105 may include the Cocoa user interface (UI) and Carbon UI 117. The Cocoa UI 115 provides a set of object oriented classes, APIs and similar resources to support the development of user applications and the user application environment. The Carbon UI 117 provides a set of procedural programs, utilities and APIs to support the development of user applications and the user application environment. Each user interface layer 105 component may include an accessibility API (AX API) 121 providing a set of classes, programs or utilities that facilitate the use of applications and the operating system by individuals with visual and physical impairments. Each AX API 121 may provide a set of classes, programs or utilities appropriate to the user interface layer in which it is placed. As used herein, the accessibility services are 'integrated' with the operating system by implementation of the AX API 121 at the user interface layer or similar layer of the operating system.

In one embodiment, the accessibility service 107 may provide a set of utilities, tools and classes that support a set of integrated accessibility features. The accessibility service 107 may provide support for an accessibility cursor navigation tool, audible interface and similar features for use by individuals with visual and physical impairments. In one embodiment, a separate text-to-speech module or program may also be present to convert text descriptions of programs, text in fields of programs and similar text into audible speech at the direction of the accessibility service 107. The audible interface and text-to-speech features may generate part of the accessibility presentation for a user. An accessibility presentation as used herein includes all non-standard user interface tools that assist an impaired user including audible output magnification, Braille output and similar output types.

There may be a number of advantages associated with integrating at least a portion of the accessibility service 107 into the operating system. First, the accessibility service may be restarted automatically if it crashes. The accessibility service 107 may be running during all user scenarios such as during installation, login sessions, even during the introduction screens that appear the first time a user boots a brand new computer. Tight integration with the operating system provides a safe mechanism for defining new keyboard shortcuts that are rooted off the same modifier keys. This decreases instability in running applications, and results in more intuitive and memorable key choices. Tight integration of the accessibility service 107 with the operating system also permits true full keyboard navigation (FKN) because the accessibility service 107 may have priority for all key mappings over user applications. This further provides a user with greater consistency in keyboard usage as the same key mappings may be consistently used across all applications.

In one embodiment, the user application layer 113 may be an environment and set of user applications that are directly utilized by a user. Input into the computer system may be provided by a user that is intended to control and interact with the user applications. User applications may be installed on the computer system by a user. User applications may include word processing applications, spreadsheet applications, video games, email programs, Internet browsers and similar applications. In one embodiment, the user applications that adopt the AX API are completely accessible by the accessibility service 107. User applications that do not adopt the AX API may provide reduced or minimal compatibility with the accessibility service 107.

Figure 2A:
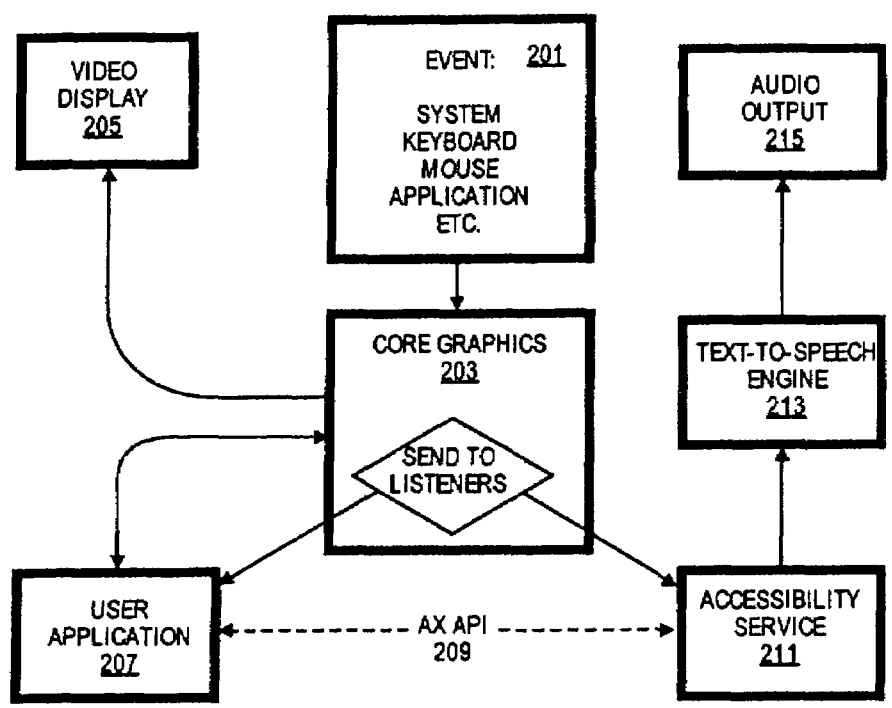
FIG. 2A is a flowchart of one embodiment of the operation of the computer system including an accessibility service.

FIG. 2A is a flowchart of one embodiment of the function of the enhanced accessibility service in the computer system. In one embodiment, the function of the accessibility service in the computer system is initiated by a system event (block 201). A system event may be an input received from a user through an input device such as a keyboard, mouse, or similar input device. A system event may also be generated by the operating system or computer system, such as a timer, interrupt or similar system event. A user application or similar user program may also generate an event to initiate the enhanced accessibility service.

In one embodiment, the system event may be passed to core graphics system. The core graphics system may be responsible for managing the graphical user interface (GUI). The core graphics system may generate a signal to display the user interface on a video display at the direction of a user application or an accessibility service. The core graphics system or similar aspect of the operating system may determine the programs that are related to the system event and forward the system event to each of these programs or operating system components or similar system components.

In one embodiment, the system event may be forwarded by the core graphics system to both a user application and to an accessibility service (block 203). The user application may respond to the input including the generation of requests to the core graphics system to update the video display (block 207). For example, a user typing to a word processing application may generate a keyboard event for each key depressed. The keyboard event may be passed to the word processor, which is a user application. The user application then requests (block 207) that the core graphics system update the video display (block 203) to reflect the changes input by the user. In this example, the word processor may request that the input letters be displayed on the video display.

In one embodiment, the accessibility service receives the system event at approximately the same time as a user application or similar programs. The accessibility service analyzes the system event to determine any changes to the user interface and user application that may occur as a result of the system event (block 211). For example, if a mouse movement event is received the accessibility service may check to determine which user interface items are now being pointed to by a mouse cursor or accessibility cursor. The accessibility service may query the user application or similar program or component that received the same system event using the AX API (block 209) to determine what changes may have been made by the system event or to retrieve data related to the system event or a change in status for the user interface. For example, an accessibility cursor may be pointed at a word processor. As new characters are typed they are displayed through the interface. These additional letters may be gathered by the accessibility service as well as displayed by the user application for further processing to enhance accessibility (e.g., text-to-speech feedback). If a user provides input relating to navigation or program operation, the application would respond and the accessibility service would monitor to determine if an enhanced accessibility should be applied.

In one embodiment, if the accessibility service determines that the user interface data has changed or an element has been selected then related text or similar data may be passed to a text-to-speech engine. The text-to-speech engine may convert text or similar input data into an audio signal that may be output to an audio output port (block 213). The audio output may be connected with a speaker system or similar device to produce the audible feedback (block 215). For example, the typed letters received by a word processor may each be announced as they are typed. The audio output may include an audio driver or program for managing an audio card or chipset to generate an audio signal to be output to a speaker system or similar audio system. In another embodiment, the accessibility program may provide other utilities to a user based on gathered input data and status. Additional utilities include augmenting audible text-to-speech feedback with contextual information, navigation information and similar information. For example, a user input that changes the current active window may generate audible feedback describing the new window selected. In one embodiment, the additional utilities provided may include additional navigation options such as slider adjustment assistance that allows a user to input a value to set a scroll bar position in a slider for a window or similar interface, an augmented audible or visual navigation menu providing special navigation options and similar augmented services.

In one embodiment, the accessibility service may specify separate voices to be utilized by the text-to-speech program. Separate voices may be utilized for different output types (e.g., actual text may have one voice and contextual information may have another voice), different output sources (e.g., different applications may have different voices assigned to them) or similar scenarios. The text-to-speech program may support any number of voices such as a range of male and female voices, cartoon style voices and similar voices for providing audible feedback to a user. In one embodiment, the accessibility services may provide an indicator with output sent to the text-to-speech program to specify which voice is to be used with an output.

In one embodiment, the accessibility services may allow a user to specify the amount of audible, Braille or other output information provided by the accessibility presentation to a user. The accessibility service may provide an interface to set a 'chattiness' level. A low chattiness level may restrict the feedback information to minimal context information, to only return specifically selected data or similar minimal feedback. A high chattiness level may prompt the accessibility service to provide a verbose description of the context of an accessibility cursor or similar information.

Figure 2B:
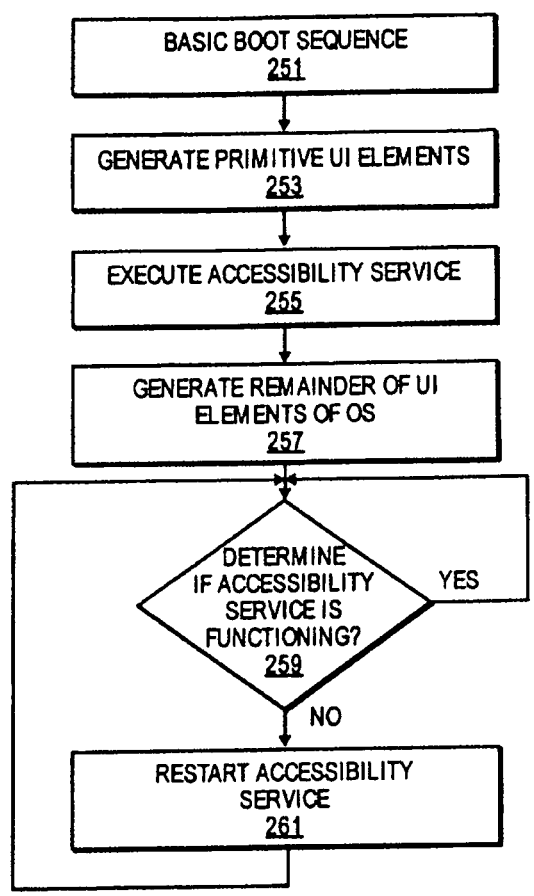
FIG. 2B is a flowchart of one embodiment of a process for automatically restarting the accessibility service.

FIG. 2B is a flowchart of one embodiment of a process for automatically restarting accessibility services if a fatal error occurs. In one embodiment, the operating system starts up using a standard boot sequence (block 251). During the boot sequence, the user interface layer generates the basic or primitive user interface elements (block 233).

In one embodiment, the AX API is utilized to start accessibility services for each user interface element (block 255). Initializing accessibility services may include generating separate threads for accessibility service components. For example separate threads may be assigned to each application manager, window manager or element manager of the accessibility service. These components are described further below. The boot sequence may continue to complete the generation of all user interface elements (block 257).

In one embodiment, the operating system may complete the boot up sequence and continue normal operation. During normal operation, the operating system may monitor the status of the components of the accessibility service (block 259). Additional application and accessibility services components may be initiated or closed during normal operation. The operating system may monitor for events that indicate the failure of an application or accessibility service component. The operating system may poll or similarly check accessibility components to determine if they are functioning normally. The check may be at the kernel level such as a kernel level daemon.

In one embodiment, detection of a fatal error for an accessibility service component or the time out of a check on a component may cause the operating system to kill the thread or process that timed out or caused the fatal error. The operating system may then restart the accessibility components (block 261). This ensures that the accessibility service will operate at all times during system start up and after start up.

In one embodiment, if all accessibility components are responsive and no fatal errors reported, the operating system continues normal operation. The operating system may continue to periodically check the accessibility service to ensure its proper function.

Figure 3A:
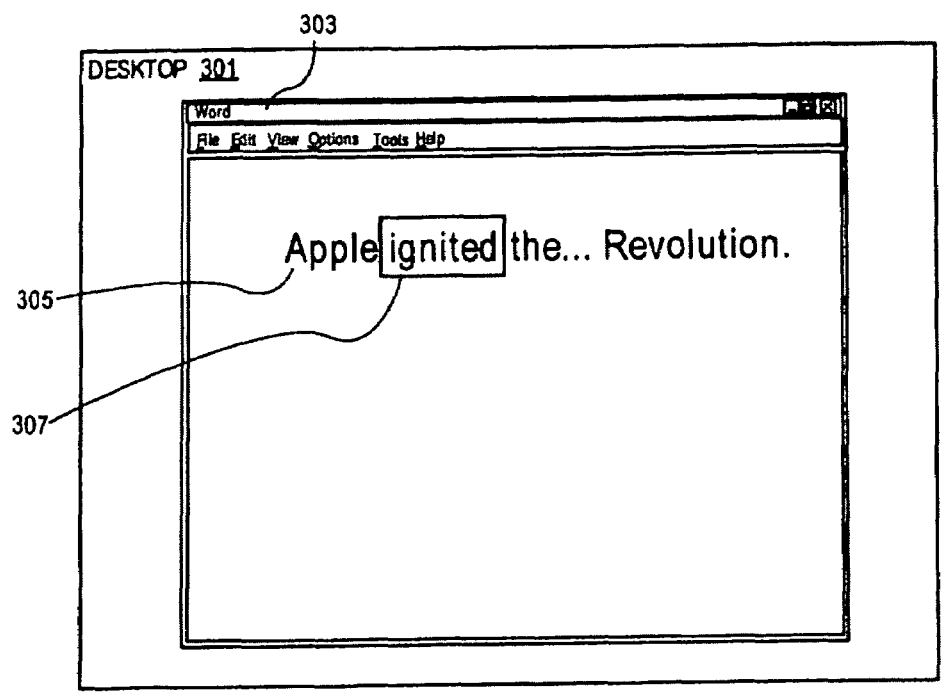
FIG. 3A is a diagram of one embodiment of an accessibility cursor.

FIGS. 3A through 3H are diagrams of embodiments of the utilities provided by the accessibility service including an accessibility cursor. FIG. 3A is a diagram of one embodiment of an accessibility cursor being used in a word processor application. In one embodiment, the accessibility cursor 307 may be used in the basic windows and desktop 301 environment. The accessibility cursor 307 may be used to cause text 305 in an application 303 to be made accessible to a user with limited vision or similar disability. The highlighted text may be output audibly by a text-to-speech program, output by a refreshable Braille display or similarly provided to a user as part of an accessibility presentation. In one embodiment, orientation and context cues may also be provided as output based on the position of the accessibility cursor 307. In one embodiment, the accessibility cursor 307 may be visible as a box or highlighting around text being 'viewed' by the user or by a similar indicator. The accessibility cursor 307 may be controlled by a keyboard or similar input device. The movement may be controlled by conventional arrow keys, hot keys or similar input. The navigation of the accessibility cursor 307 may enable access and control of various elements of application programs, including editable elements and non-editable elements.

In this regard, the use of the accessibility cursor 307 may enable a visually impaired computer user to obtain audio information regarding non-editable visual cues on the screen such as static text, prompts, icons, etc. Further, in addition to reading the text of a selected editable element, the accessibility service may also be capable of describing visual context surrounding the text and elements on the display screen.

Figure 3B:
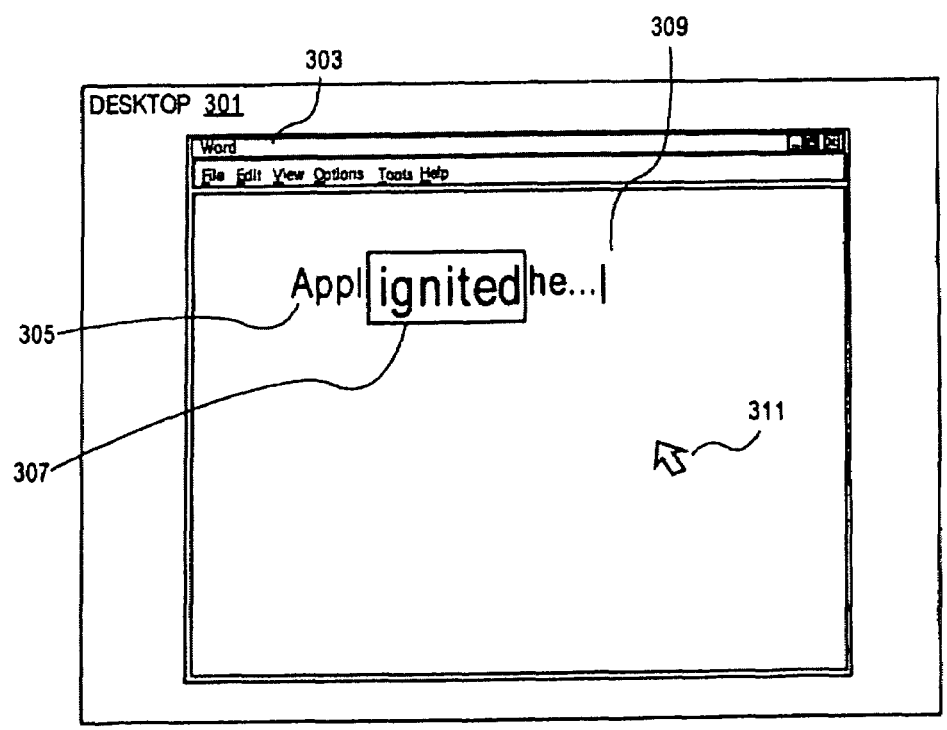
FIG. 3B is a diagram of one embodiment of text magnification provided by an accessibility cursor.

FIG. 3B is a diagram of one embodiment of the accessibility cursor of FIG. 3A where the cursor has zoomed on the selected text. Many low-vision screen reader users utilize a combination of limited vision in conjunction with accessibility software. To facilitate usefulness for low-vision users, the accessibility cursor may have the ability to magnify its currently focused element with a zoom function. This technique is different from full screen magnification offered on many conventional systems, as it only magnifies the element of interest. For some visually impaired uses, this may make it easier to follow the accessibility cursor on the screen, and positively identify which element is in focus.

In one embodiment, placing the accessibility cursor 307 over text 305 may cause the text to be enlarged to facilitate viewing by users with limited vision. The zoom may be automatic or controlled by a user. For example, magnification may be initiated by keyboard input. The user may provide input through the keyboard or similar input device to control the zoom and focus of the accessibility cursor. In one embodiment, the user may specify the size of the accessibility cursor or the amount of text or similar display elements to be magnified during a zoom. In one embodiment, a user may zoom in to a maximum zoom that renders the element being viewed translucent allowing a user to view the information behind that element.

In one embodiment, the accessibility cursor may be operated independently of the keyboard cursor 309, mouse pointer 311 or similar cursor or pointer system. A user may control the accessibility cursor separately by use of a separate input device, separate subset of keys, separate operations mode or similar system.

Figure 3C:
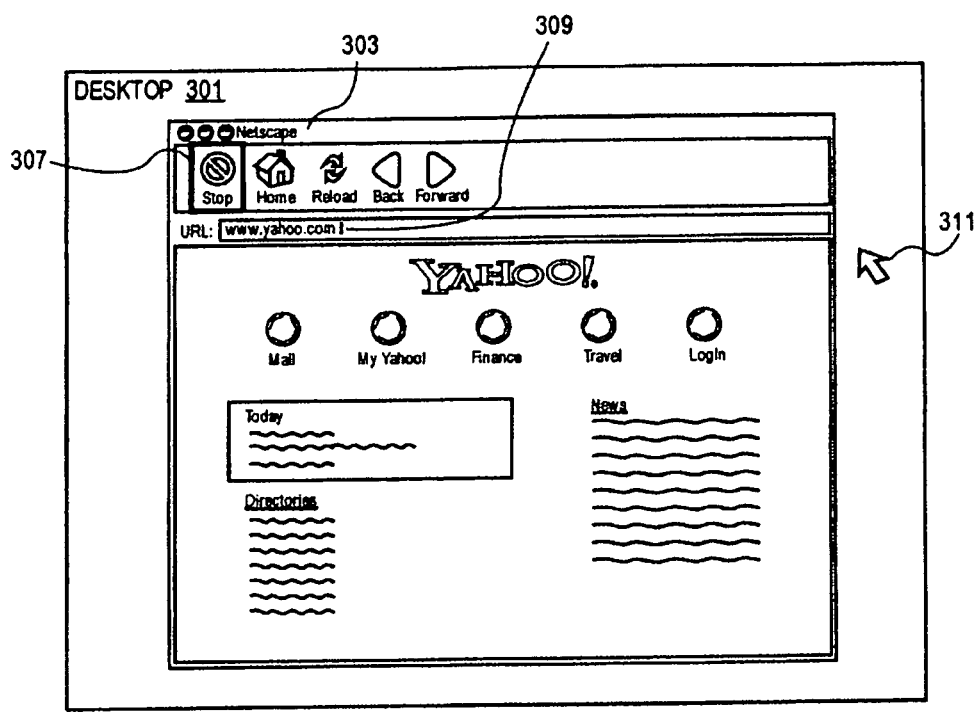
FIG. 3C is a diagram of one embodiment of an accessibility cursor indicating a navigation element.

FIG. 3C is a diagram of one embodiment an accessibility cursor in a browser application. The accessibility cursor 307 may move independently of the keyboard cursor 309 or mouse pointer 311. The user may move the accessibility cursor 307 to an element in a running application, interrogate elements, and in some cases even manipulate certain elements without affecting the keyboard cursor 309 or mouse pointer 311. The accessibility cursor may provide the ability to glance, inspect, and control elements in a running application while allowing the keyboard cursor to be used for primary input.

Figure 3D:
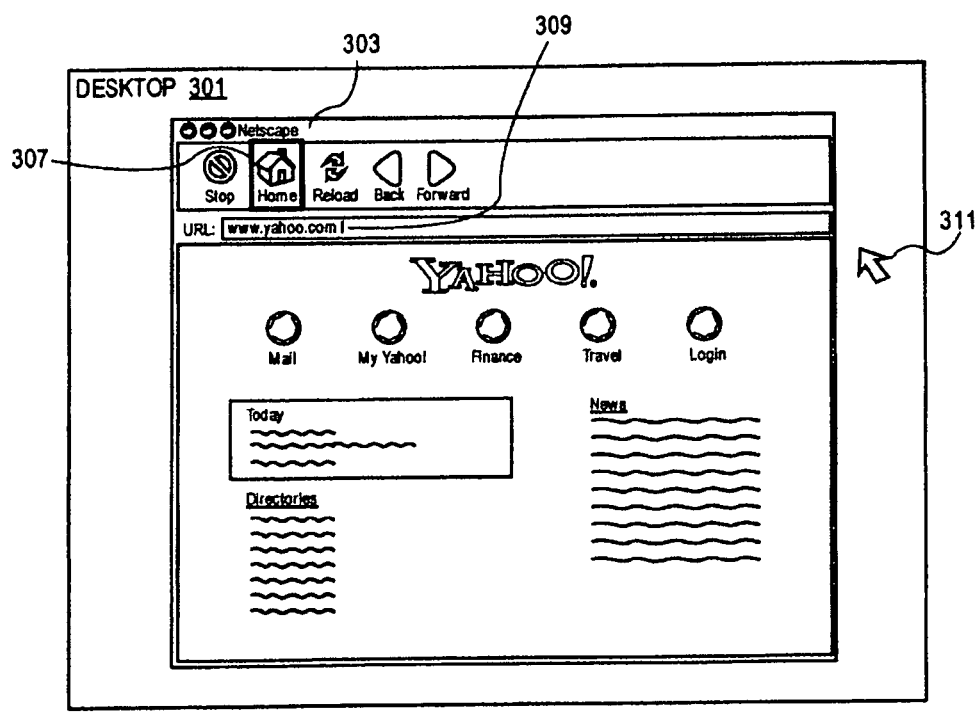
FIG. 3D is a diagram of one embodiment of an accessibility cursor selecting a navigation option.

The accessibility cursor 307 may be used to select an element such as a button, menu option or similar navigation option. In one embodiment, the accessibility cursor 307 may highlight, box or similarly indicate the selected element. For example, accessibility cursor 307 highlights a 'stop' option in FIG. 3C. FIG. 3D illustrates the movement of accessibility cursor 307 to highlight a 'home' option without affecting the keyboard cursor 304 or mouse pointer 311.

Figure 3E:
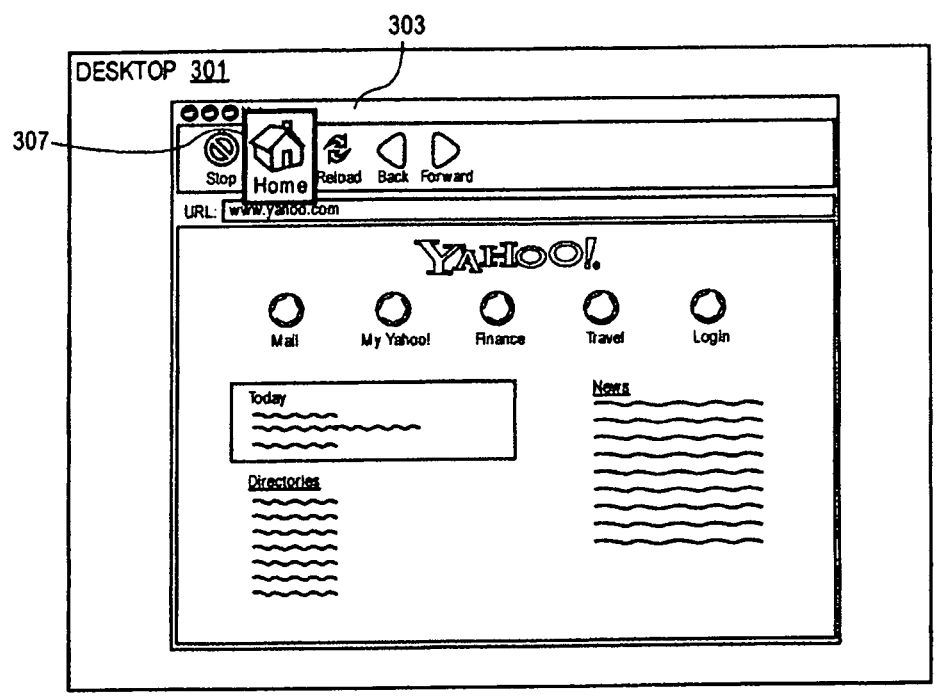
FIG. 3E is a diagram of one embodiment of an accessibility cursor selecting a navigation option.

FIG. 3E is a diagram of one embodiment of the accessibility cursor of FIG. 3E. The cursor has zoomed on the selected element. In one embodiment, placing the accessibility cursor 307 over the element may cause the element to be enlarged to facilitate viewing by a user with limited vision. The zoom may be automatic or controlled by a user. The user may provide input through the keyboard or similar input device to control the zoom and focus of the accessibility cursor. In one embodiment, the use may specify the size of the accessibility cursor or the number of elements to be magnified.

Figure 3F:
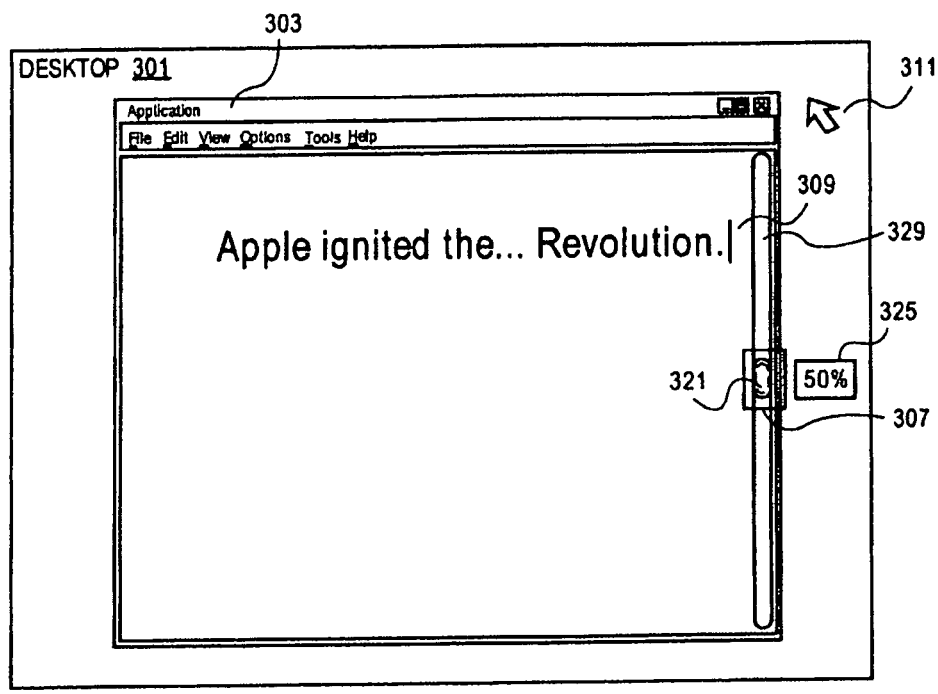
FIG. 3F is a diagram of one embodiment of an accessibility service providing a slide position selector tool.

FIG. 3F is a diagram of one embodiment of the accessibility service providing a slider adjustment tool. Speech is a low-bandwidth communication vehicle, thus, conveying a sufficient amount of contextual information might produce paragraphs of spoken text. The accessibility service may break up this text into useful chunks, which can be queried and navigated by pressing keyboard keys. By adding the accessibility cursor 307 as a distinct and separate cursor from the keyboard cursor, restrictions on how a particular accessibility control can be designed are removed. The design need not be compromised by the existing keyboard cursor's capabilities, which may be useful for a sighted user, but which may actually hinder a blind user. For example, full keyboard navigation (FKN) provides the ability to increase and decrease the value of a slider control by using the arrow keys. While this might accomplish the task, it can be unwieldy or time consuming for a blind user.

In one embodiment, a slider adjustment tool may be utilized for application 303 running in the windowing or desktop environment 301. The accessibility cursor 307 may be utilized to select a slider 321. The accessibility service may provide an input mechanism 325 to allow a user to input a numeric value to indicate the desired position of the scroll bar. The accessibility cursor 307 may also provide feedback regarding the current position or context of the scroll bar in the slide 329. With the combination of the accessibility cursor and a custom accessibility slider control, a more efficient method of input can be designed which offers a better experience for the blind user, without impacting the original keyboard cursor's behavior.

Figure 3G:
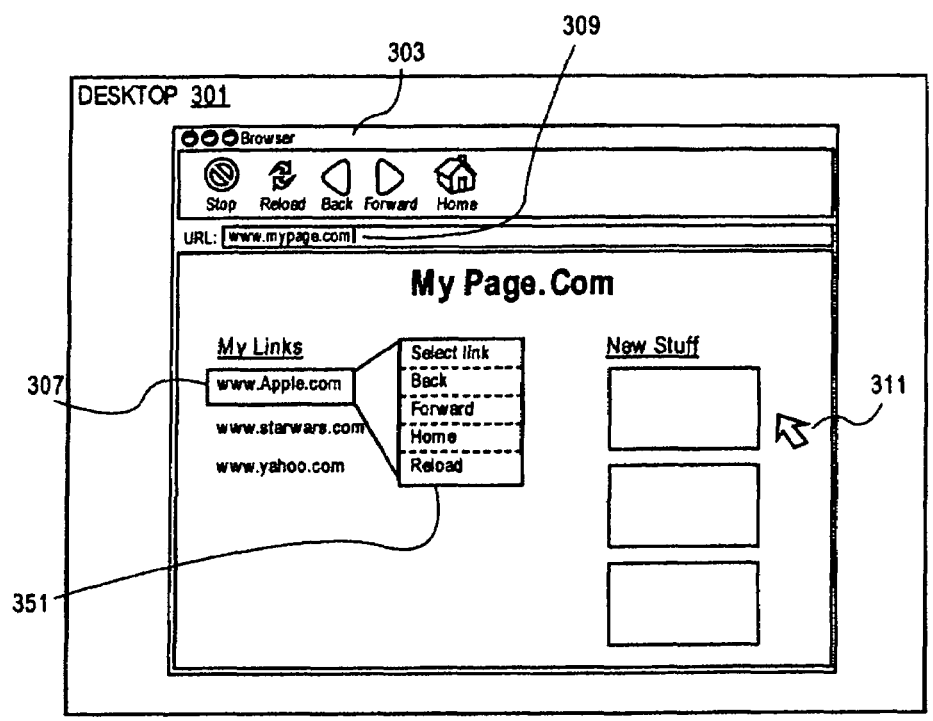
FIG. 3G is a diagram of one embodiment of an accessibility service providing a smart menu.

FIG. 3G is a diagram of one embodiment of a smart menu tool provided by the accessibility service. One problem associated with conventional accessibility applications is that it is difficult for a user to learn numerous keyboard definitions and remember which options are available at any given time. This problem is mitigated by one embodiment of the accessibility service that provides a "smart" menu that displays all commands that are appropriate for the current situation. In one embodiment, the accessibility service may operate in a desktop or window environment 301 and in conjunction with an application such as a browser 303. The accessibility cursor 307 may provide a menu 351 of current navigation or similar options that are currently available. For example, if the cursor highlights a link in a webpage through a browser 303 then the smart menu may present current options, audibly or through similar method, such as 'back', 'forward,' 'select', 'home', and similar options. In other examples, the user can focus on a button and have one possible command, such as, "press", or the user could land on an element (e.g., slider) that has several possible commands, such as, "increase," "decrease," "jump to minimum" and "jump to maximum." In each case, the smart menu contains only what is appropriate at the given time.

Figure 3H:
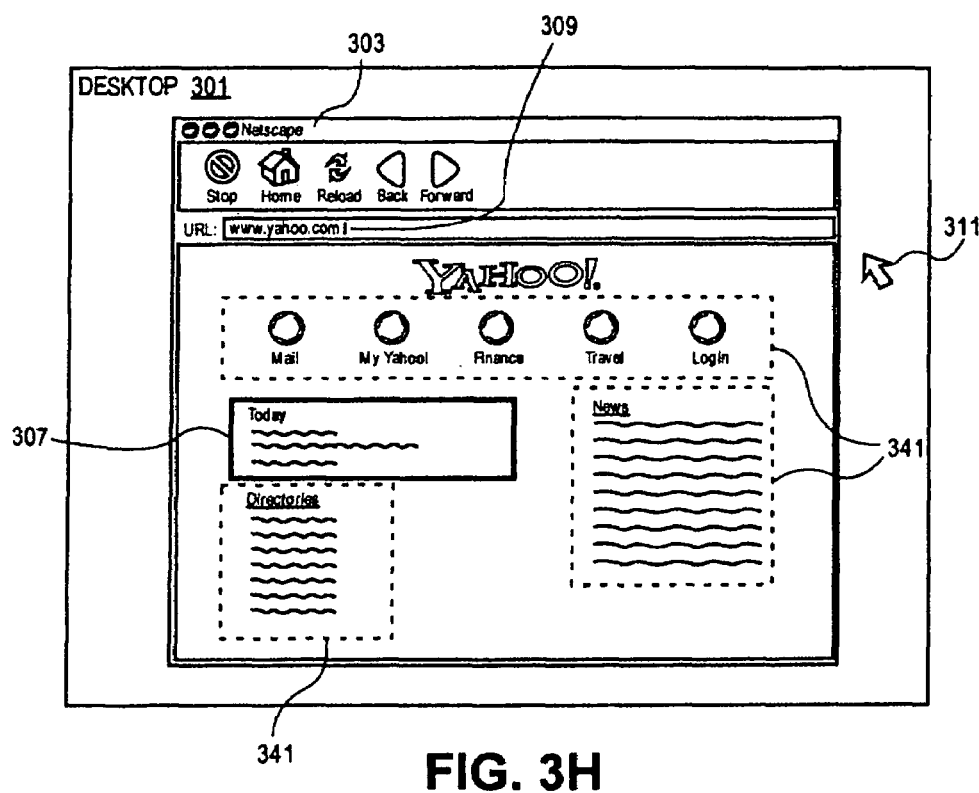
FIG. 3H is a diagram of one embodiment of an accessibility service providing a blocking navigation feature.

FIG. 3H is a diagram of one embodiment of a blocking interface. In one embodiment, additional features that may be provided by the accessibility services include block navigation. The accessibility service may group large sets of navigation options or similar information into navigation blocks 341 to facilitate the ease of navigation through the information. This may be particularly useful in scenarios where a large number of navigation options or information may be available. For example, a web page accessed by a browser may provide a large number of links. A user with vision may easily identify the link that is desired. The accessibility service assists a user by grouping or blocking the navigation options or presented information. The user may gain some general description of a block and navigate the block in a tree like fashion or 'drill-down' to a particular navigation option by descending into subgroups or subblocks of a selected block using an accessibility cursor 307 without having to select a navigation option.

In one embodiment, the accessibility service may provide contextual summarizing information to assist in the navigation of various structures. For example, a user examining a table may obtain information regarding the number of columns and rows in the table. In addition to summarizing, the user may set the accessibility service to text or context character by character, spell phonetically (e.g., "B as in boy"), provide and indicate the presence of help functions or documents, provide orientation information (e.g., character position, word position, line position, and reading range settings), provide a list of running applications or windows, provide a feedback submission tool, key command descriptions, provide and indicate the presence of tool tips and similar utilities.

Figure 3I:
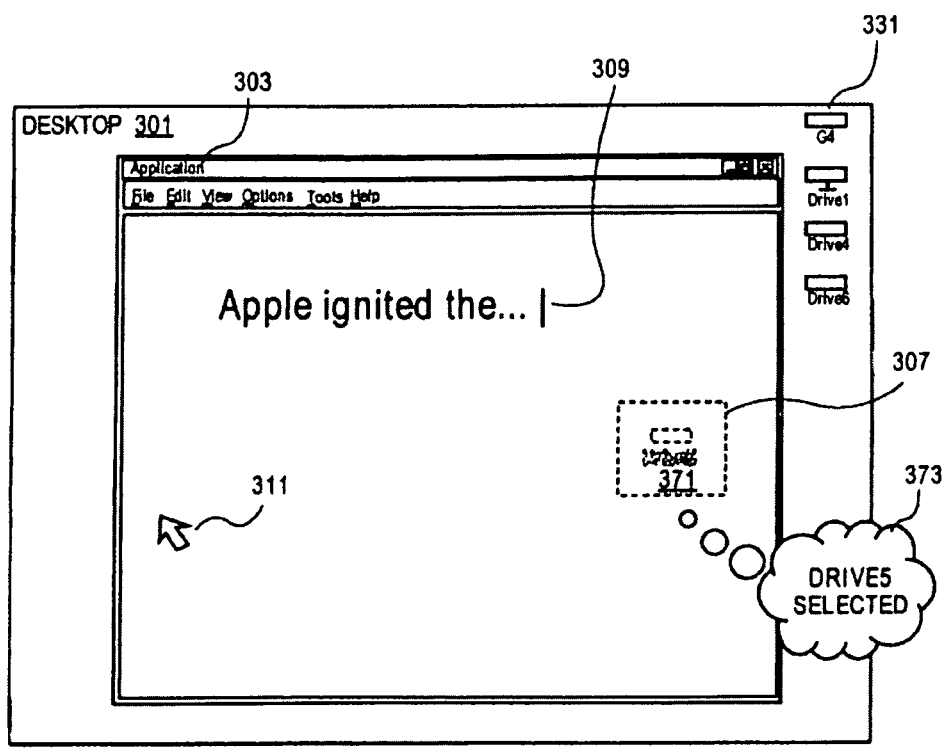
FIG. 3I is a diagram of one embodiment of an accessibility service providing access to an obscured user interface element.

FIG. 3I is a diagram of one embodiment of an accessibility cursor accessing an obscured user interface element. The accessibility services may provide the ability to move the accessibility cursor 307 to background applications, and it may even access elements which are obscured by overlapping windows. Accordingly, the accessibility cursor 307 feature may provide overcompensation for lack of vision, providing even more capabilities than a sighted user would otherwise have. Since the accessibility cursor 307 can move into background applications, even to elements 371 that are visually obscured by overlapping windows, the accessibility cursor 307, according to one embodiment, has the ability to temporarily reveal the visual appearance of elements that are hidden behind other windows. This may be accomplished by a user simply holding down a keyboard combination to bring that element forward. When the key is released, the element may drop back to its original level. Combined with the element magnification, this can provide useful aid to a partially sighted user. In one embodiment, obscured elements may be described audibly 373 using the text-to-speech module or the obscured feature may be similarly presented to a user.

In one embodiment, the accessibility service may include an event capture mode or 'greedy' mode. The greedy mode routes all input to the accessibility service. This mode may be used by the accessibility service at times when the user wants to issue a key or mouse event that should only be interpreted by the accessibility service or similarly restrict usage. For example, the user may utilize greedy mode to work around a non responsive application.

In one embodiment, the accessibility service may include a practice mode. The practice mode may utilize the greedy mode to route all input to the accessibility service. This mode may be used to allow a user to practice the use of the accessibility service. This mode may provide audible feedback so that a user may learn keys, key combinations and similar input.

In one embodiment, another feature offered by the accessibility service may be navigation option search. The search may look for navigation options that are available in a given context by pairing down the number of options based on progressive input from a user. For example, a user may be typing a uniform resource locator (URL) in a web browser, a name of a file or the name of a similar resource. The accessibility service begins to search for possible matching resources as each letter of the name is input. This provides the user with a faster navigation tool than having to 'tab' or similarly scan through possible navigation options.

In one embodiment, a web browser or similar application may utilize the enhanced accessibilities services. An accessibility cursor may be utilized to 'glance' at navigation options independent of the mouse pointer or keyboard cursor without having to select a navigation option. For example, a user may leave a keyboard cursor in a URL input field while glancing at links on a webpage. The accessibility cursor may be utilized to select text or links in a webpage to be magnified to assist a visually impaired user to more clearly inspect text or links without having to alter the default text sizing for a webpage that might distort the layout of the page.

In one embodiment, the accessibility service may be used to facilitate the viewing of lengthy webpages or frames of a website. The accessibility service provides enhanced scrolling services where a numerical value designating a scroll bar position may be specified. The accessibility services may describe the number of frames, overall size of a page or provide similar context information to facilitate web browsing. As described above, the accessibility services may provide smart menus to facilitate the selection of navigation options. Smart menus in a browser may make common browsing options such as returning to a previous page or refreshing a page easily accessible.

In one embodiment, blocking may be utilized in a web browser to facilitate navigation. A webpage may be sectioned or 'blocked' based on page based criteria or user based criteria. For example, navigation links may be blocked into internal site links and external links. Similarly web content may be blocked based on the category content or position on a page. 'Glancing' at a block provides an overview of the data of a block. Blocks may be layered or nested within a single page providing additional descriptive information, subcategorization or similar assistance.

Sonar Navigation & Presenting a Web Page

Sonar navigation allows a user to move the accessibility cursor to user interface (UI) elements that are adjacent (above, below, left, or right). Sonar navigation uses hit detection and smart algorithms to determine the closest neighboring UI element in the region located in the direction of interest. Hit detection is a mechanism that takes a screen coordinate and asks for the UI element under that coordinate via the accessibility channel. Sampling and hit detecting are used interchangeably herein to describe this testing for elements at specific coordinates. Furthermore, pattern-sampling is used herein to describe the performing of hit detection a number of times in a specific pattern.

In one embodiment, the navigation method simulates the way a sighted person sweeps the region, rather than using programmatic lists of elements. Given the location of an accessibility cursor, the sonar navigation technology will first sample the region on the screen using hit detection in the user specified direction (up, down, left, right). The region to sample simulates the way a sighted person glances across a page. Our eyes generally sweep the portion of the region immediately next to the current, then narrows the focus of sweeping as the focus gets into a more distant portion of the region from the current position. So the sampling technique employed in sonar navigation utilizes a similar technique of sampling a near and distant portion. Once the closest UI is located during the sampling, the accessibility cursor will then navigate to that adjacent UI element.

Figure 6:
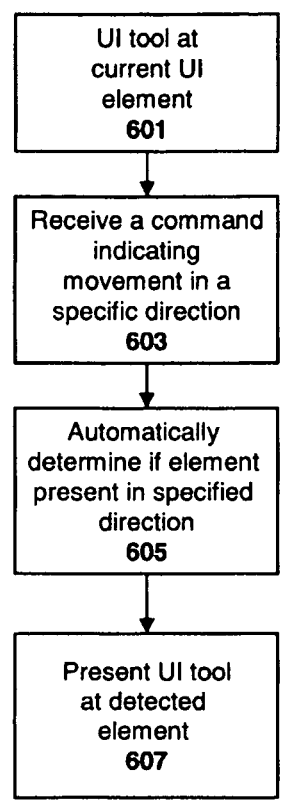
FIG. 6 illustrates a flowchart for presenting a web page, according to one embodiment of the invention.
Figure 7:
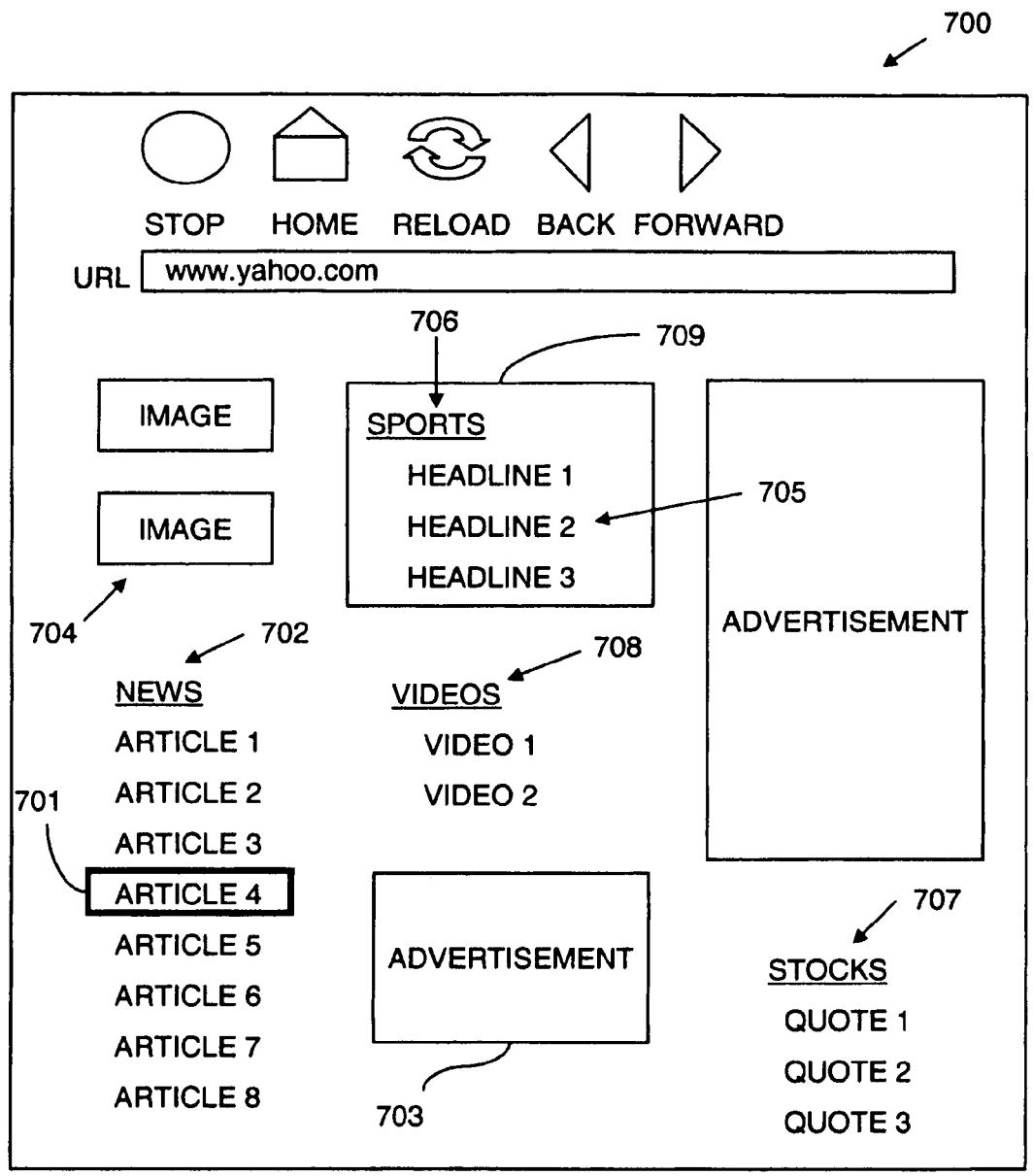
FIG. 7 illustrates an exemplary web page presented using the accessibility service.

FIG. 6 illustrates a flowchart for presenting a web page, according to one embodiment of the invention. FIG. 7 illustrates an exemplary web page presented using the accessibility service. The following paragraphs will refer to FIG. 7 in order to provide a better understanding of the process. Web page 700 is presented with various UI elements presented on the page. Various images are displayed, e.g., image 704, advertisement 703, etc., and may each be a UI element. Furthermore, text may also be a UI element, whether it is one word, for example, or an entire section (e.g., an entire paragraph of text). For instance, in FIG. 7, section 709 may be a UI element and comprise a category title ("Sports") and content ("Headline 1", "Headline 2", "Headline 3"). Various sections of the web page are shown with category titles—e.g., News 702, Sports 706, Stocks 707, and Videos 708. The category titles are parents in the section and the content (e.g., the headlines) are its children—e.g., Headline 705 is a child of the parent Sports 706. Alternatively, a category title and each of its children may all be its own UI element. For example, Sports 706 would be a UI element and Headline2 705 may be its own UI element.

Navigation begins with a UI tool (e.g., an accessibility cursor) at a current location as represented by block 601. The first location may be any element on the webpage (e.g., text, image, video, etc) or a default location (e.g., top left corner, center of the screen, etc.). Any UI tool (e.g., providing an audible output of the UI element, providing a Braille output of the UI element, an accessibility cursor, etc.), or any combination of UI tools, may be used to indicate the first location. It should be apparent that the underlying principles of the invention are not limited to the exemplary UI tools shown. For example, in the embodiment shown in FIG. 7, an accessibility cursor 701 is illustrated at the current UI element—the fourth article in the News group 702—however, any UI tool, or combination of UI tools, could be used instead.

In block 603, the accessibility service receives a command indicating a movement in a specific direction. The indication of movement may derive from the user operating an input device that is part of the computer system—e.g., a mouse, keyboard, joystick, microphone, or similar input device. For example, referring to FIG. 7, a user may want to know what is to the right of current UI element 701 (i.e., to the right of the fourth article title in the News group 702). To do so, the user may indicate a movement to the right. The accessibility service receives the indication of movement in a specific direction and, in block 605, automatically determines whether an element of the web page is present in a region of the web page in the specified direction from the current UI element. This includes sampling for elements of the web page in the region. Referring to FIG. 7, the closest UI element to the right of current UI element 701 is advertisement 703. If the current UI element is image 704, for example, then the closest UI element to the right would be section 709 if the entire section is a UI element. If each child and parent is considered its own UI element, then either Sports 706 or Headline2 705 would be the closest UI element, depending on which one was closer. In one embodiment, only a certain level of the content is considered (e.g., only parents, or only up to children, or only up to grandchildren, etc. Once an element is detected and determined to exist, a UI tool is presented for the detected element, as indicated in block 607. The presenting of the UI tool may include generating a visible indicator (e.g., accessibility cursor) at the detected element and/or providing an audible output for the detected element and/or providing a Braille output for the detected element.

Figure 8:
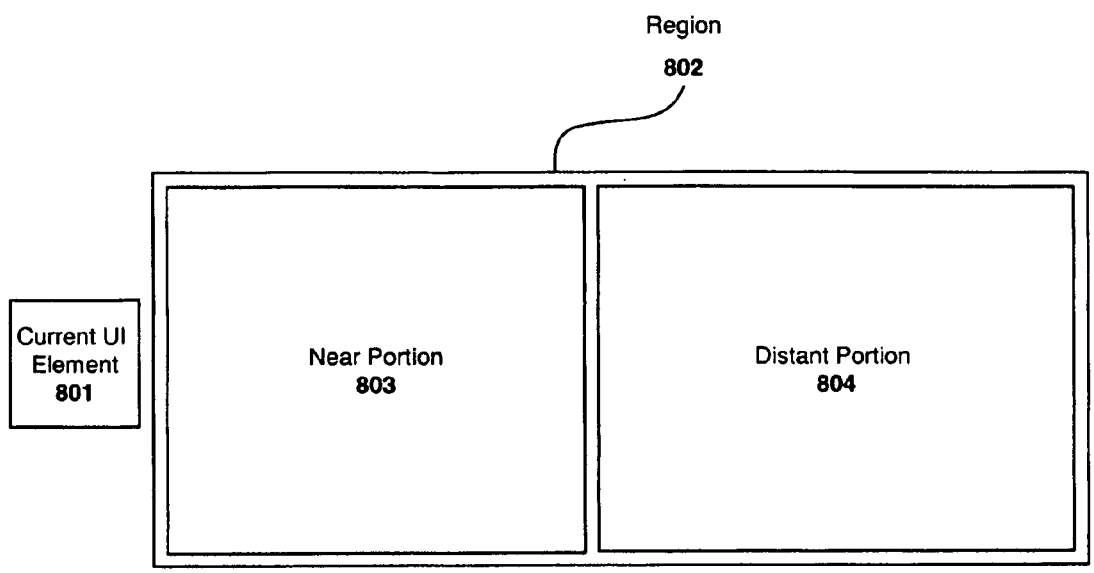
FIG. 8 illustrates an exemplary region in a user specified direction from a current UI element, according to one embodiment of the invention.

Various types of sampling may be implemented to automatically determine whether an element of the web page is present in a region of the web page. In one embodiment, pattern-sampling may be implemented. FIGS. 8-10 provide a more in depth look at various examples of types of sampling that may be implemented.

FIG. 8 illustrates an exemplary region in a user specified direction from a current UI element, according to one embodiment of the invention. If the user specified direction is to the right of current UI element 801, then region 802 will be sampled. Region 802 comprises near portion 803 and distant portion 804. The length of near portion 803 and distant portion 804 may vary and may be determined in a variety of ways—e.g., the near portion of the region extends a predetermined number of pixels in the specified direction. This number may vary for different directions (e.g, up, down, left, right). For example, the near region may extend 100 pixels when in the specified direction to the right, but only 50 pixels when in the specified direction upwards. The distant portion may also extend for a predetermined number of pixels or, for example, to the end of the web page.

Pattern sampling may be implemented and be of various types of patterns (e.g., parabola, straight line, zig zag line, etc.). An algorithm for pattern-sampling may, for example, perform hit detection in multiple layers of parabola patterns to check for UI elements in the near portion of the region. The distance and width of the patterns may be determined relative to the current UI element. The direction of the pattern-sampling may vary—e.g., toward the current UI element, away from the current UI element, etc. For instance, in the parabola example, the parabola with the maximum parabola vertex (i.e., furthest away from the current UI element) would be hit detected first, and then a parabola with a smaller parabola vertex (i.e., shorter distance away from the current UI element) would be hit detected next, and so on until a parabola with a parabola vertex nearest the current UI element is reached. As another example, the direction can be away from the current UI element, moving toward the vertex of the largest parabola layer. As yet another example, the direction may alternate from furthest to closest parabolas while working towards the parabola with the vertex as the middle point. Furthermore, the distances between the parabolas may vary—e.g., the distances between one parabola and the next may be equal incremental distances, in exponential distances, etc.

The order of the pattern-sampling layers for hit detection may vary. In one embodiment, the order of the pattern-sampling layers will be in an equally spaced out lengths in one direction, eventually filling out every layer of the pattern. If a UI element is detected inside one of the pattern layers, then a smaller pattern will be initiated to continue hit detecting the remaining areas between the current UI element and the just detected UI element to see if there are any other UI elements situated between the current UI element and the just detected UI element.

In one embodiment, pattern-sampling is performed in the near portion 803 of the region 802 first, and if no UI element is detected inside the near portion 803 of the region, then the detection algorithm resorts to pattern-sampling in the distant portion 804 of the region 802. The pattern-sampling in the distant portion 804 of the region 802 may be a different pattern for pattern-sampling than the pattern used in the near portion 803 of the region. In this way, a pattern can be used in the near portion 803 to cover much of the near portion 803 of the region near the current UI element as possible. Then, if no UI element is detected in the near portion 803, a second pattern can be used in the distant portion 804 to limit the areas to do a hit test and sample faster across the distant portion. For example, a parabola pattern may be used in the near portion 803 of the region 802 and a zig zag pattern may be used in the distant portion 804 of the region 802 (e.g., from the maximum parabola vertex moving away from the current UI element). Hitting the near portion 803 before the distant portion 804 allows any UI elements close to the current UI element to have a higher chance of becoming the next UI element, similar to how our eyes absorb more details when sweeping closer around the starting point.

On a webpage, a plurality of lines of text (e.g., a paragraph of text) can sometimes be represented as a UI element. When applied to a paragraph of text that is a UI element, the sonar detection may find the closest line of text to the current UI element. For example, referring to FIG. 7, if the current UI element is image 704 and adjacent UI element is a column of text lines (e.g., section 709), the sonar detection can figure out the line closest to the detection point by requesting the bounds of each line from the web engine. Then a UI tool may be presented at the beginning of that particular line. Referring to FIG. 7, if the current UI element is image 704, then sonar detection will check the bounds of each line of text to the region to the right and determine that Headline 705 is closest to the current UI element and thus the UI tool is presented at "Headline 705" of the detected element.

Figure 9A:
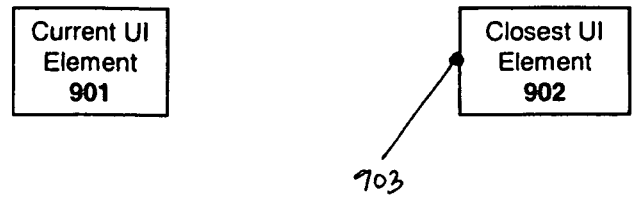
FIGS. 9a-d illustrate pattern-sampling in the pattern of a parabola, according to one embodiment of the invention.
Figure 9B:
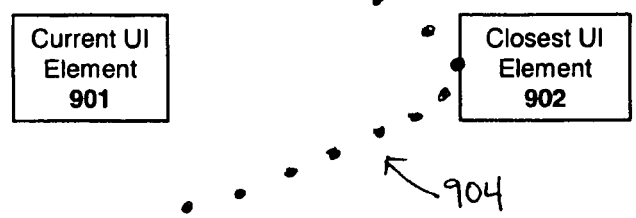
Figure 9C:
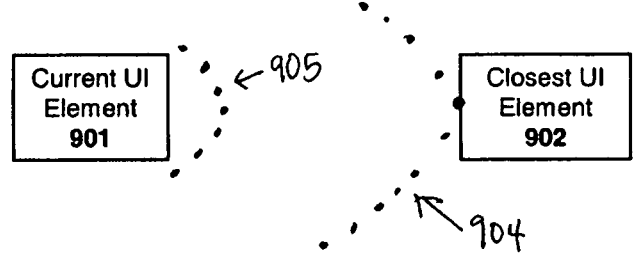
Figure 9D:
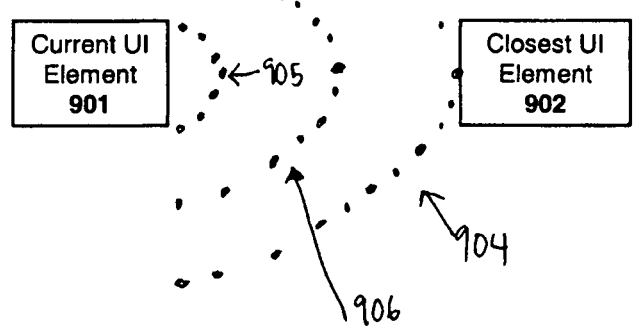

FIGS. 9a-d illustrate pattern-sampling in the pattern of a parabola, according to one embodiment of the invention. In FIG. 9a, current UI element 901 and closest UI element 902 are shown. If the user wishes to determine what is located to the region to the right of the current UI element 901, the user would indicate to move in the direction to the right. Pattern-sampling for an element begins and an initial hit testing is taken at coordinate 903, which for example is 100 pixels to the right of current UI element 901. In the example shown, closest UI element 902 is detected during the initial hit testing. After the initial hit testing, further hit testing is initiated in the area to the left of the UI element 902 along parabola 904 to see if any other UI elements are closer to the current UI element, as illustrated in FIG. 9b. In this case, the coordinate 903 resides at the vertex of the parabola 904. Once the hit testing for parabola 904 is complete, further pattern-sampling is repeated at different areas to the left of the UI element 902 along different parabolas until all the layers of the pattern are filled. The location of parabolas may be chosen in a variety of ways—e.g., in incremental distances closer to the current UI element 901, in exponential distances towards the current UI element 901, in alternating distances from furthest from the current UI element 901 to closest while working towards the middle point, etc. FIG. 9c illustrates a second pattern-sampling performed in an area near the current UI element 901 along parabola 905. Next, in FIG. 9d, pattern-sampling occurs in an area between parabola 904 and parabola 905, along parabola 906. Since each layer of pattern-sampling did not detect another UI element closer to the UI element 902, UI tool may be presented for the detected UI element, i.e., closest UI element 902. The presenting of the UI tool may include generating a visible indicator (e.g., an accessibility cursor) at the closest UI element and/or providing an audible output and/or providing a Braille output for the closest UI element.

Figure 10A:
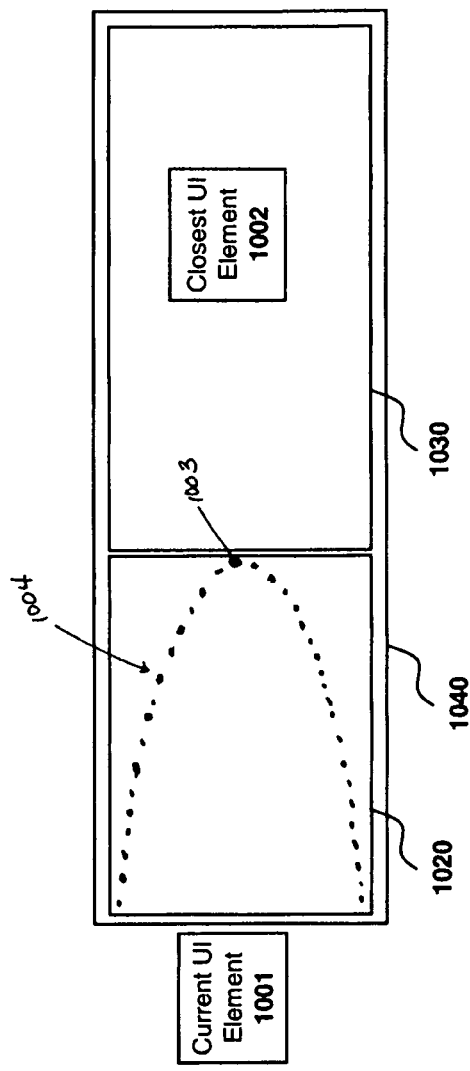

FIG. 10a-d illustrate pattern-sampling in a near portion and distant portion of a region, according to one embodiment of the invention. In FIG. 10a, a near portion 1020 and distant portion 1030 of region 1040 are shown to the right of current UI element 1001. Closest UI element 1002 is shown located in the distant portion 1030. If, for example, the user wishes to determine what is located to the region to the right of the current UI element 1001, the user would indicate to move in the direction to the right. Pattern-sampling for an element begins and an initial hit testing is taken at a coordinate 1003, which for example is 100 pixels to the right of current UI element 1001. In one embodiment, coordinate 1003 is located at the end of the near portion 1020, closest to distant portion 1030. It should be noted that hit testing may be initiated anywhere along the pattern, and is not required to begin at the coordinate shown in the exemplary embodiments.

Figure 10B:
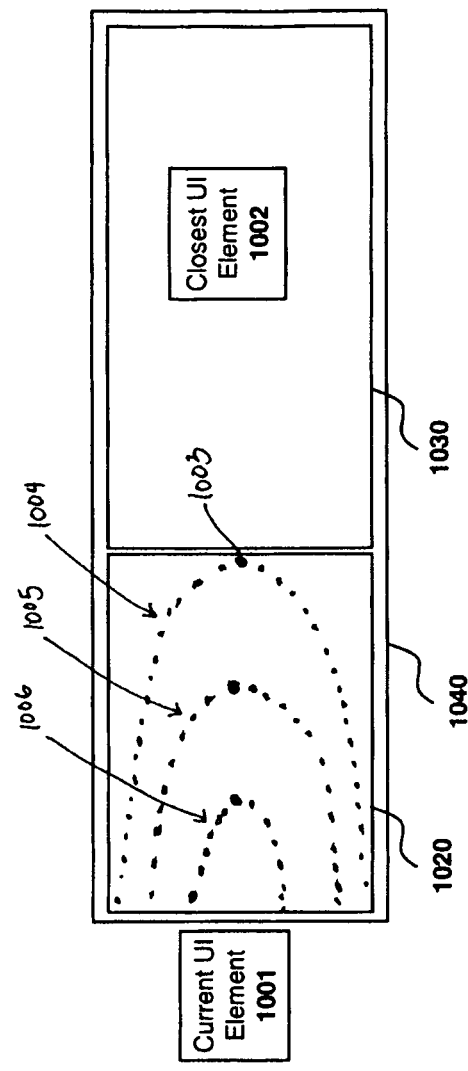

In the example shown, no element is detected during the initial hit testing. After the initial hit testing, further hit testing is initiated in the area to the left of the UI element 1002 along parabola 1004 to see if any UI elements are located closer to the current UI element. Once the hit testing for parabola 1004 is complete, further pattern-sampling is repeated at different areas to the left of the UI element 1002 along different parabolas until all the layers of the pattern are filled. FIG. 10b illustrates pattern-sampling along parabola 1004, followed by parabola 1005, and then parabola 1006. After pattern-sampling in the direction towards the closest UI element 1001, FIG. 10c illustrates further pattern sampling performed between the parabolas shown in FIG. 10b. In this exemplary embodiment, after pattern-sampling of parabola 1006, pattern-sampling of parabola 1007 is performed next, followed by parabola 1008 and parabola 1009. While this ordering of pattern-sampling is illustrated in this example, the order of the parabolas may be chosen in a variety of ways to cover the near portion 1020 of region 1040. Since no element is detected during the pattern-sampling of the near portion 1020, pattern-sampling of the distant portion 1030 is performed, as illustrated in FIG. 10d. As stated earlier, a different pattern may be used, and in this exemplary embodiment, a zig zag pattern is used. Hit testing begins at coordinate 1010 and continues to the right along zig zag line 1011 until detecting closest UI element 1002 at coordinate 1012. Again, initial hit testing may be initiated anywhere along the zig zag line. Since, coordinate 1012 is the first coordinate along zig zag line 1011 to detect a UI element, a UI tool may be presented for the detected UI element—i.e., closest UI element 1002. Again the presentation of the UI tool may include, for example, generating a visible indicator (e.g., an accessibility cursor) for the detected element and/or providing an audible output for the detected element and/or Braille output for the detected element.

It should be understood by one skilled in the art that different patterns may be used in the near portion and distant portion of the region than what was illustrated in the exemplary embodiments of FIGS. 9a-d and FIGS. 10a-d.

Figure 11:
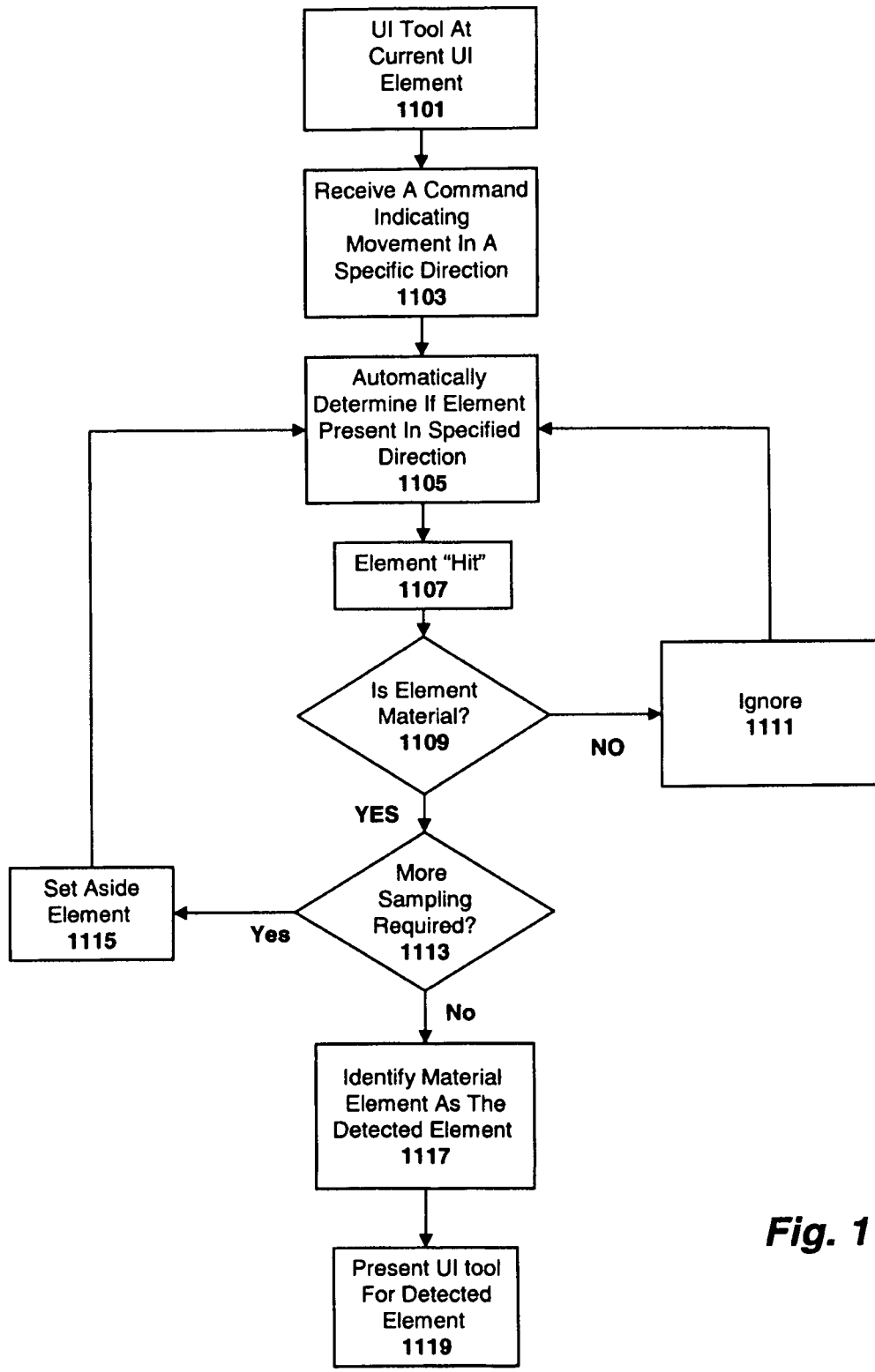
FIG. 11 is a flowchart for presenting a web page taking into consideration an elements materiality, according to one embodiment of the invention.

FIG. 11 is a flowchart for presenting a web page taking into consideration an elements materiality, according to one embodiment of the invention. At block 1101, the UI tool is located at a current UI element. At block 1103, the accessibility service receives a command indicating a movement in a specific direction, as similarly described in the FIG. 6. At block 1105, the accessibility service automatically determines whether an element of the web page is present in a region of the web page in the specified direction from the current UI element, as similarly described in FIG. 6. In block 1105, an element is "hit" (i.e., determined to be present). In block 1107, the accessibility service automatically determines if a "hit" element is a material element. It does so by evaluating the hit element against at least one rule for materiality. A variety of rules may be used to test for materiality. For example, a rules may be based on whether the element meets a predetermined threshold pixel size (length and/or width). The idea being that elements smaller than a certain size are not important or may be ignored. Another rules may be based on whether the element meets a threshold degree of child lineage. For instance, only a parent and its children may be material but not grandchildren. Another rules may include or exclude certain elements based on its type—e.g., images, videos, texts, etc.—and/or its size—e.g., minimum threshold font size, either alone or relative to other font sizes on the web page. Furthermore, it should be understood that a single rules or multiple rules may be implemented.

If the element is determined to not be a material element, then the "hit" element is ignored, as represented by block 1111. At this point, the accessibility service will continue sampling for another element. In block 1111, if the element is determined to be a material element, then the accessibility service will determine whether more sampling is required, as represented by block 1113. If more sampling is required, then the material element will be set aside, as represented by block 1115, and sampling will continue for another element. Depending on the type of sampling (e.g., pattern, order, direction, etc.), more sampling may be required to find a closer element. If a closer material element is found, then the closer material element will take precedence over the previous material element. Also it should be noted that various rules may be implemented to determine which material element should take precedence (e.g., a parent material element taking precedent over a subsequently found child material element). If no more sampling is required, then the "hit" element which is determined to be material is identified as the "detected element", as represented by 1117. If multiple "hit" elements are determined to be material, then the material element with precedence is identified as the detected element. In one embodiment, the material element is an entire section of a webpage—e.g., a plurality of lines of text. In such case, the closest line of text to the detection point can be determined by requesting the bounds of each line from the web engine. Then a UI tool can be presented at the beginning of the closest line of text. It should be understood that the beginning of the line may include text itself—e.g., the title or headline, etc.

In block 1119, a UI tool is presented for the detected element. Again, the presenting of the UI tool may include generating a visible indicator (e.g., accessibility cursor) at the detected element and/or providing an audible output for the detected element and/or providing a Braille output for the detected element.

As an example, referring to FIG. 7, sampling may be initiated from current UI element 701 in the specified direction to the right. Sampling may produce a "hit" with advertisement element 703. Advertisement element 703 may be an image and a rule for materiality may preclude images from being material. In this case, sampling would continue until element 707 is "hit". The rule for materiality would be performed against element 707. Since element 707 is a "Stocks" category title and not an image, element 707 would be determined to be a material element. If no more sampling is required, then element 707 would become the detected element, and a UI tool would be presented for it.

Implementing the Accessibility Cursor

Figure 4:
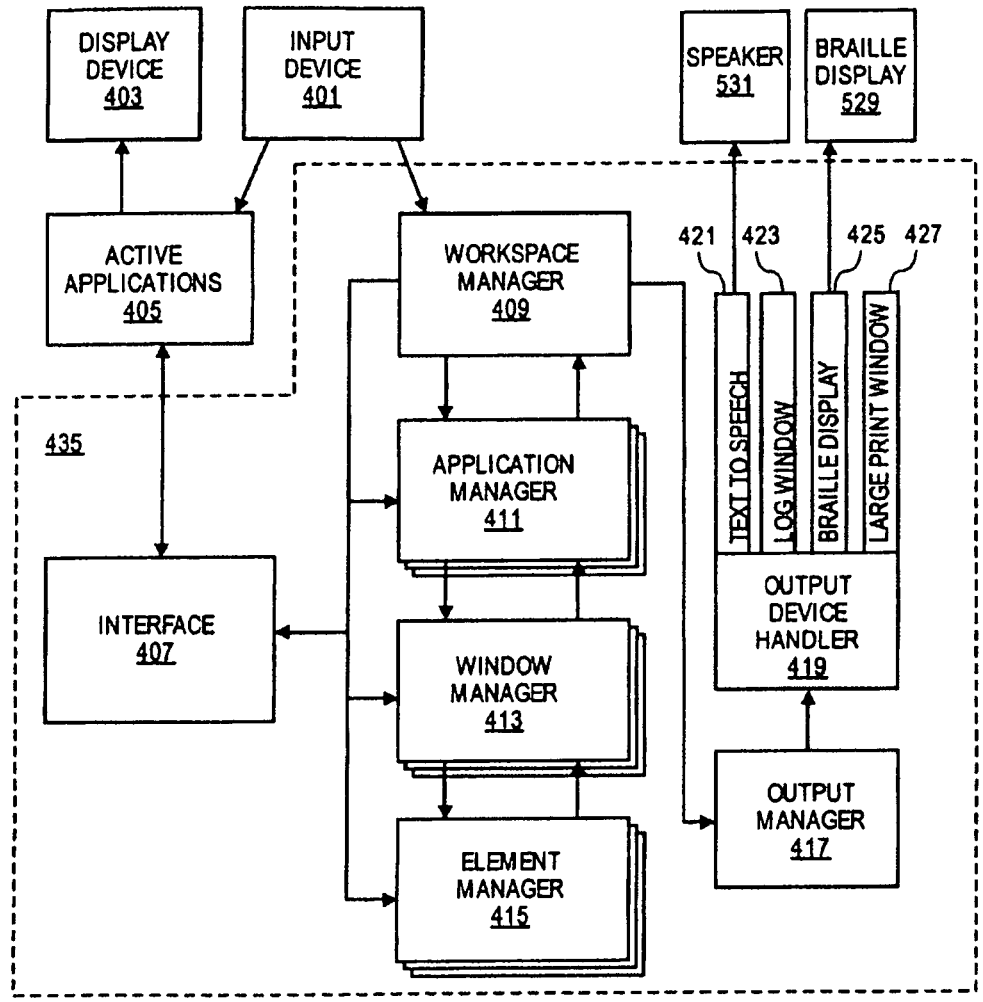
FIG. 4 shows, in a block diagram format, an architecture of one embodiment of the operation of the accessibility service.

FIG. 4 is a diagram of one embodiment of the accessibility service. In one embodiment, the accessibility service may be implemented in an object oriented paradigm. In another embodiment, the accessibility service may be implemented in a procedural, functional or similar paradigm. An embodiment of an object orient implementation is described for sake of convenience. One of ordinary skill would understand that other embodiments utilizing other programming paradigms and techniques may be utilized.

In one embodiment, the accessibility service 409 may be part of the operating system of a computer. An input device 401 may be part of the computer system to allow a user to interact with active applications 405. The input device 401 may be a mouse, keyboard, joystick, microphone, or similar input device. Active applications 405 may be any type of application including, word processing applications, browser applications and similar applications managed by the operating system of the computer. Input received by the operating system from an input device 401 is sent to both the active applications 405 and to the workspace manager 409 of the accessibility service 435. An active application 405 may process the incoming input and update its state, store data, or update its display interface that is output to the display device 403 through the core graphics system or similar graphics system.

In one embodiment, the workspace manager 409 may track each of the applications being executed by the operating system including the currently active application. The workspace manager 409 may analyze the incoming input to determine if it should be forwarded directly to the output manager 417 or if further processing of the input may be required. In one embodiment, the workspace manager 409 is an object having its own thread. In one embodiment, the workspace manager 409 may create an event or results object upon reception of the input data. The event object may be utilized to initiate an analysis of the input data. The input data may be analyzed to determine the type of the input being received. For example, the input data may be keyboard input, including a character key or hot key input, pointer device input, or similar input type. A determination may be made as to which application the input is associated with.

In one embodiment, if the input is character data or similar data that may not require further processing, the input data may be placed in a results object and forwarded to the output manager 417. If the input is a hot key, mouse input or similar input that may indicate that a navigation option has been selected then the input may require further processing. A navigation option may indicate that a user has sent input that requests a change in the current window focus, selected application, that the user has selected a menu, menu option or similar application or operating system interface option or command. The workspace manager 409 may check an application to determine if the input is related to a navigation option or similar function. The workspace manager 409 may track hot keys or similar navigation options for each application or may query the application to determine if the input is a navigation or similar option.

In one embodiment, the workspace manager 409 may utilize an interface 407 to communicate with the active application or other applications to determine if the input corresponds to a navigation option or similar command. In one embodiment, the interface may include an accessibility API, including a concrete implementation of the API in the form of an adaptor or similar implementation. In one embodiment, an additional abstraction layer may be present in the interface to provide a standard interface if multiple adapter implementations may be present in the system. The interface 407 provides a set of functions, classes, methods, utilities or similar programs to allow the accessibility program to communicate with applications being executed by the operating system.

In one embodiment, if the workspace manager 409 is able to resolve the input completely, it may record the resolution and context information in a result object sent to the output manager 417. Resolving an input may include effecting a navigation option, e.g., changing a focused window, confirming input, repositioning the accessibility cursor, recording input and context to be output and similar actions. Resolving an input may include providing the accessibility tools to a user including the slide adjustable tool and smart menu tool. Providing accessibility tools may include communication with the core graphics system to draw the tools to the display device 403.

In one embodiment, an application manager object 411 may track all windows or each of the windows associated with a particular application. In one embodiment, each application executed by the operating system has a corresponding application manager 411. In one embodiment, the application manager 411 may work in conjunction with the workspace manager 409 to determine if there is a corresponding hot key or similar navigation input at the application level. The application manager 411 may primarily resolve navigation options related to window related navigation options such as switching windows in a single application. If the application manager 411 finds a mapping for the input, the appropriate response data may be placed in the results object which may then be returned to the output manager 417. The application manager 411 may query applications using the interface 407.

In one embodiment, each application manager 411 may be executed with a separate thread. The multithreaded processing of events prevents the lock up of navigation for all applications if the application manager 411 for one application encounters a fatal error. This improves the robustness of the accessibility service and minimizes the potential for a user to be stranded while utilizing applications run by the operating system. If an application manager 411 encounters a fatal error, it may be restarted without adversely affecting the accessibility of other applications. The accessibility service may auto restart any application manager or similar component including a workspace manager when it encounters a fatal error to ensure that a user is not left without accessibility services in any context.

In one embodiment, if the application manager 411 and workspace manager 409 are not capable of completely resolving an input, then the event or result object may be passed to a window manager 413. The window manager 413 may track elements associated with a particular window. The event or result object may be passed to a particular window manager 413 based on its association with the currently focused window or similar criteria. The window manager 413 may resolve hot keys and similar input associated with particular elements of a window. An element may be a particular menu, button, text field or similar component of a window. The window manager 413 may build or maintain an element map for tracking the elements of a window. The window manager 413 may communicate through interface 407 with the applications to resolve the input or pass the input to an element manager 415.

In one embodiment, the event or result object may be passed to the current active element manager 415 or other element manager. The element manager 415 seeks to resolve the input such as determining a hot key functionality. Elements may contain nested elements and if a particular element manager 415 is unable to completely resolve the input then the event or result object may be forwarded to the manager of nested elements until the input is completely resolved. In one embodiment, the process of resolving the input is a recursive process. The event and results object may be passed to the lowest nested element before being checked to be resolved. The results object and event object may be passed back up the chain to be progressively resolved. Once the input is completely resolved the results object may be returned to the output manager 417. The element managers may communicate through interface 407 with the applications to obtain information by querying the application.

In one embodiment, the output manager 417 handles result objects and provides the resolution of input stored in the results object to output device handler 419. The output device handler 419 and the devices may operate as separate processes from the accessibility service. The result object may contain information added at different levels of the chain of analysis (i.e., the workspace manager down to the element manager). For example, the workspace manager may be responsible for echoing keys and may add echo string in to the search result. If a user types cntrl-right-arrow the workspace manager may place a "move right" indicator into the result object before passing the result object on for further processing. The window object may subsequently perform the actual move to the new element adding its description to the result object. The final result object sent to the object manager 407 may contain "move right" and element name field.

In one embodiment, the output device handler 419 may pass the result information to each of the output devices or may selectively send the result information to output devices based on the type of data the result contains. Output devices may include a text-to-speech program 421 that converts the output result information to a signal to a speaker 431, a log window 423, Braille display program 425 to operate a refreshable Braille display 429, a large print window generator 427 and similar output programs and devices. The output device handler 419 may be modular and output devices may be added to and removed from the handler. A user may configure how output is handled. A user may designate certain types of result data to handled by certain devices or to be ignored. For example, the "move right" information in the result may be provided audibly to a user through the text-to-speech 321 outlet and the element name field may be provided to a user through the refreshable Braille display 429.

Figure 5:
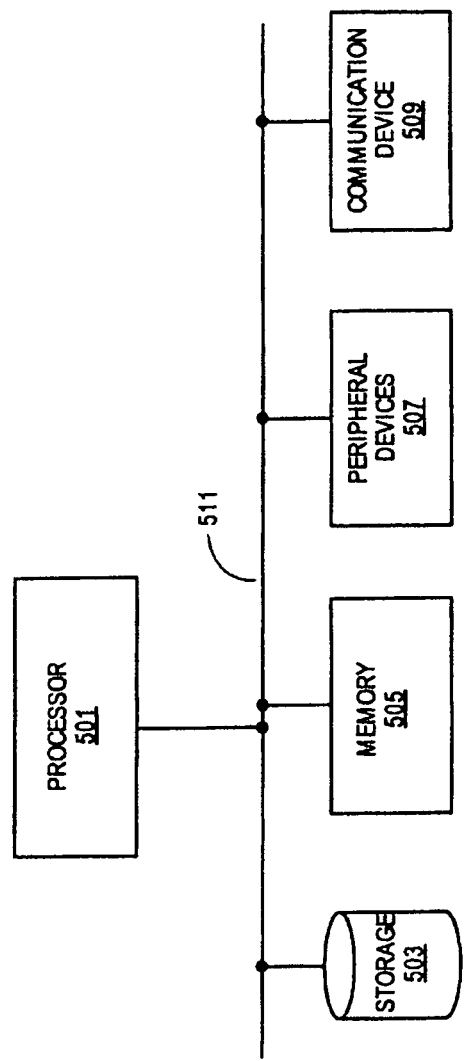
FIG. 5 is a diagram of a computer system for executing one embodiment of the accessibility service.

FIG. 5 is a diagram of one embodiment of a computer system for implementing the accessibility service. In one embodiment, the computer system may include a processor 501 or set of processors to execute the operating system, applications, services and similar programs. The processor may be a general purpose processor, application specific integrated circuit (ASIC) or similar processor. Processor 501 may be in communication via a bus 511 or similar communication medium with a memory device 505. Memory device 505 may be a system memory device or set of devices such as double data rate (DDR) memory modules, synchronized dynamic random access memory (SDRAM) memory modules, flash memory modules, or similar memory devices. Memory device 505 may be utilized by processor 501 as a working memory to execute the operating system, services, applications, file handling system and similar programs.

In one embodiment, the computer system may include a storage device 503. Storage device 503 may be a magnetic disk, optical storage medium, flash memory, or similar storage device. Storage device 503 may be utilized to store the operating system and services such as the accessibility service. Storage device 503 may organize components in a file system. Stored components may include program files, operating system and services files, file handling system files, class files, temporary files and similar files and data structures. The computer system may also include a set of peripheral devices 507. Peripheral devices 507 may include input devices, sound system devices, graphics devices, display devices, auxiliary storage devices, refreshable Braille display devices or similar devices or systems utilized with a computer system.

In one embodiment, the computer system may include a communication device 509. Communication device 509 may be a networking device to allow the computer system, operating system, applications, services and similar programs to communicate with other computers, applications, services and similar programs. In one embodiment, communication device 509 may be utilized to communicate with a remote database and retrieve or receive updates for the operating system and services from the database.

In one embodiment, the operating system and accessibility service may be implemented in software and stored or transmitted in a machine-readable medium. As used herein, a machine-readable medium is a medium that can store or transmit data such as a fixed disk, physical disk, optical disk, CDROM, DVD, floppy disk, magnetic disk, wireless device, infrared device, and similar storage and transmission technologies.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A method, comprising:
   at an electronic device with a display and one or more input devices:
      displaying, on the display, a web page that includes a plurality of selectable elements;
      while a respective location in the web page is currently selected, receiving, via the one or more input devices, a command to identify a selectable element in a specified direction from the respective location within the web page;
      in response to the command:
         scanning through the web page to detect a next selectable element from the respective location, the scanning comprising sampling for elements of the web page in the specified direction, and wherein sampling includes hit detection at specific coordinates along a pattern; and
         in accordance with a determination that a first selectable element is a next selectable element from the respective location in the respective location, selecting the first selectable element, and presenting a plurality of options for interacting with the web page with reference to the first selectable element; and
         in accordance with a determination that a second selectable element is a next selectable element from the respective location in the respective location, selecting the second selectable element, and presenting a plurality of options for interacting with the web page with reference to the second selectable element.

2. A method as in claim 1, wherein the presenting a plurality of options for interacting with the web page with reference to either the first selectable element or the second selectable element includes generating a visible indicator at the detected element.

3. A method as in claim 1, wherein the presenting a plurality of options for interacting with the web page with reference to either the first selectable element or the second selectable element includes at least one of providing an audible output or providing a Braille output.

4. A method as in claim 1 wherein the sampling for elements of the web page comprises:
   pattern-sampling for an element at a first area in a near portion of the region; and
   pattern-sampling for an element at a different area in the near portion of the region.

5. A method as in claim 4 wherein the pattern-sampling in the first area and in the different area are parabola patterns.

6. A method as in claim 4 wherein the sampling for elements of the web page further comprises:
   pattern-sampling for an element in a distant portion of the region if no element is detected in the near portion, wherein the pattern sampling in the near portion is a first pattern and the pattern-sampling in the distant portion is a second pattern.

7. A method as in claim 6 wherein the first pattern is a parabola and the second pattern is a zig-zag.

8. A method as in claim 1, further comprising:
   evaluating a hit element against at least one rule for materiality; and
   identifying the hit element as the detected element if determined to be material.

9. A method as in claim 8, further comprising:
   identifying the hit element as a section of the web page, the section comprising a plurality of lines of text;
   requesting the bounds of each line;
   determining a closest line of the plurality of lines of text to a detection point of the hit element;
   wherein the plurality of options for interacting with the web page are presented at a beginning of the closest line.

10. A machine readable non-transitory medium having instructions stored therein which when executed cause a machine with a display and one or more input devices to perform a set of operations comprising:
  displaying, on the display, a web page that includes a plurality of selectable elements;
  while a respective location in the web page is currently selected, receiving, via the one or more input devices, a command to identify a selectable element in a specified direction from the respective location within the web page;
  in response to the command:
    scanning through the web page to detect a next selectable element from the respective location, the scanning comprising sampling for elements of the web page in the specified direction, and wherein sampling includes hit detection at specific coordinates along a pattern; and
    in accordance with a determination that a first selectable element is a next selectable element from the respective location in the respective location, selecting the first selectable element, and presenting a plurality of options for interacting with the web page with reference to the first selectable element; and
    in accordance with a determination that a second selectable element is a next selectable element from the respective location in the respective location, selecting the second selectable element, and presenting a plurality of options for interacting with the web page with reference to the second selectable element.

11. The machine readable non-transitory medium of claim 10 wherein the presenting a plurality of options for interacting with the web page with reference to either the first selectable element or the second selectable element includes generating a visible indicator at the detected element.

12. The machine readable non-transitory medium of claim 10 wherein the presenting a plurality of options for interacting with the web page with reference to either the first selectable element or the second selectable element includes at least one of providing an audible output or providing a Braille output.

13. The machine readable non-transitory medium of claim 10 wherein the sampling for elements of the web page comprises:
  pattern-sampling for an element at a first area in a near portion of the region; and
  pattern-sampling for an element at a different area in the near portion of the region.

14. The machine readable non-transitory medium of claim 13 wherein the pattern-sampling in the first area and in the different area are parabola patterns.

15. The machine readable non-transitory medium of claim 13 wherein the sampling for elements of the web page further comprises:
  pattern-sampling for an element in a distant portion of the region when element is detected, wherein the pattern sampling in the near portion is a first pattern and the pattern-sampling in the distant portion is a second pattern.

16. The machine readable non-transitory medium of claim 15 wherein the first pattern is a parabola and the second pattern is a zig-zag.

17. The machine readable non-transitory medium of claim 10, having further instructions stored therein which when executed cause a machine to perform a set of instructions further comprising:
  evaluating a hit element against at least one rule for materiality; and
  identifying the hit element as the detected element if determined to be material.

18. The machine readable non-transitory medium of claim 17, having further instructions stored therein which when executed cause a machine to perform a set of instructions further comprising:
  identifying the hit element as a section of the web page, the section comprising a plurality of line of text;
  requesting the bounds of each line;
  determining a closest line of the plurality of lines of text to a detection point of the hit element;
  wherein the plurality of options for interacting with the web page are presented at a beginning of the closest line.

19. The method of claim 1, further comprising:
  generating a user interface to allow a user to navigate a web page; and
  executing an accessibility service to provide an accessibility presentation of user interface elements for the web page.

20. The machine readable non-transitory medium of claim 10, further comprising:
  generating a user interface to allow a user to navigate a web page; and
  executing an accessibility service to provide an accessibility presentation of user interface elements for the web page.

21. The method of claim 1, wherein the plurality of options for interacting with the web page include web page navigation options.

22. The method of claim 1, wherein the plurality of options for interacting with the web page include element interaction options.

23. The method of claim 1, wherein command to identify selectable elements includes selection of a navigation option in a menu that corresponds to a selectable element at the respective location.

24. The machine readable non-transitory medium of claim 10, wherein the plurality of options for interacting with the web page include web page navigation options.

25. The machine readable non-transitory medium of claim 10, wherein the plurality of options for interacting with the web page include element interaction options.

26. The machine readable non-transitory medium of claim 10, wherein command to identify selectable elements includes selection of a navigation option in a menu that corresponds to a selectable element at the respective location.

27. An electronic device comprising:
  one or more processors;
  a display;
  one or more input devices;
  memory; and
  one or more programs stored in the memory, the one or more programs comprising instructions for:
    displaying, on the display, a web page that includes a plurality of selectable elements;
    while a respective location in the web page is currently selected, receiving, via the one or more input devices, a command to identify a selectable element in a specified direction from the respective location within the web page;
    in response to the command:
      scanning through the web page to detect a next selectable element from the respective location, the scanning comprising sampling for elements of the web page in the specified direction, and wherein sampling includes hit detection at specific coordinates along a pattern; and in accordance with a determination that a first selectable element is a next selectable element from the respective location in the respective location, selecting the first selectable element, and presenting a plurality of options for interacting with the web page with reference to the first selectable element; and in accordance with a determination that a second selectable element is a next selectable element from the respective location in the respective location, selecting the second selectable element, and presenting a plurality of options for interacting with the web page with reference to the second selectable element.

28. The electronic device of claim 27, wherein the presenting a plurality of options for interacting with the web page with reference to either the first selectable element or the second selectable element includes generating a visible indicator at the detected element.

29. The electronic device of claim 27, wherein the presenting a plurality of options for interacting with the web page with reference to either the first selectable element or the second selectable element includes at least one of providing an audible output or providing a Braille output.

30. The electronic device of claim 27, wherein the sampling for elements of the web page comprises:

pattern-sampling for an element at a first area in a near portion of the region; and pattern-sampling for an element at a different area in the near portion of the region.

31. The electronic device of claim 30, wherein the pattern-sampling in the first area and in the different area are parabola patterns.

32. The electronic device of claim 30, wherein the sampling for elements of the web page further comprises:

pattern-sampling for an element in a distant portion of the region if no element is detected in the near portion, wherein the pattern sampling in the near portion is a first pattern and the pattern-sampling in the distant portion is a second pattern.

33. The electronic device of claim 32, wherein the first pattern is a parabola and the second pattern is a zig-zag.

34. The electronic device of claim 27, further comprising:

evaluating a hit element against at least one rule for materiality; and identifying the hit element as the detected element if determined to be material.

35. The electronic device of claim 34, further comprising:

identifying the hit element as a section of the web page, the section comprising a plurality of lines of text;

requesting the bounds of each line;

determining a closest line of the plurality of lines of text to a detection point of the hit element;

wherein the plurality of options for interacting with the web page are presented at a beginning of the closest line.

36. The electronic device of claim 27, wherein the plurality of options for interacting with the web page include web page navigation options.

* * * * *